(12) United States Patent
Xu et al.

(10) Patent No.: US 11,816,880 B2
(45) Date of Patent: Nov. 14, 2023

(54) FACE RECOGNITION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Jianqing Xu, Shenzhen (CN); Pengcheng Shen, Shenzhen (CN); Shaoxin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/744,260

(22) Filed: May 13, 2022

(65) Prior Publication Data
US 2022/0270348 A1 Aug. 25, 2022

Related U.S. Application Data

(63) Continuation of application No. PCT/CN2021/085978, filed on Apr. 8, 2021.

(30) Foreign Application Priority Data

May 22, 2020 (CN) .......................... 202010438831.2

(51) Int. Cl.
G06V 10/75 (2022.01)
G06V 40/16 (2022.01)
G06V 10/77 (2022.01)
G06V 10/74 (2022.01)
G06V 10/774 (2022.01)
G06V 10/776 (2022.01)

(52) U.S. Cl.
CPC .......... *G06V 10/751* (2022.01); *G06V 10/761* (2022.01); *G06V 10/774* (2022.01);
(Continued)

(58) Field of Classification Search
CPC ............... G06V 10/751; G06V 10/761; G06V 10/7715; G06V 10/774; G06V 10/776;
(Continued)

(56) References Cited

U.S. PATENT DOCUMENTS 9,576,221 B2 * 2/2017 Mayle .................. G06V 10/462
2008/0219516 A1 * 9/2008 Suzuki ................. G06V 40/161
382/209

(Continued)

FOREIGN PATENT DOCUMENTS

CN 1886748 A 12/2006
CN 101281598 A 10/2008
(Continued)

OTHER PUBLICATIONS

The State Intellectual Property Office of the People's Republic of China (SIPO) Office Action 1 for for 202010438831.2 dated Jul. 13, 2020 9 Pages (including translation).
(Continued)

*Primary Examiner* — Md K Talukder
(74) *Attorney, Agent, or Firm* — Anova Law Group, PLLC

(57) ABSTRACT

A face recognition method includes: obtaining a first feature image that describes a face feature of a target face image and a first feature vector corresponding to the first feature image; obtaining a first feature value that represents a degree of difference between a face feature in the first feature image and that in the target face image; obtaining a similarity between the target face image and a template face image according to the first feature vector, the first feature value, and a second feature vector and a second feature value corresponding to a second feature image of the template face image, the second feature value describing a degree of difference between a face feature in the second feature image (Continued)

and that in the template face image; and determining, when the similarity is greater than a preset threshold, that the target face image matches the template face image.

20 Claims, 11 Drawing Sheets

(52) U.S. Cl.
CPC ........ *G06V 10/776* (2022.01); *G06V 10/7715* (2022.01); *G06V 40/168* (2022.01); *G06V 40/172* (2022.01)

(58) Field of Classification Search
CPC .... G06V 40/168; G06V 40/172; G06V 40/16; G06F 18/214; G06F 18/22; G06N 3/045
See application file for complete search history.

(56) References Cited

U.S. PATENT DOCUMENTS

| | | | |
|---|---|---|---|
| 2014/0056490 A1* | 2/2014 | Kawahara | G06V 40/171 382/118 |
| 2014/0079297 A1 | 3/2014 | Tadayon et al. | |
| 2016/0012317 A1* | 1/2016 | Mayle | G06V 10/462 382/159 |
| 2017/0262695 A1* | 9/2017 | Ahmed | G06V 40/165 |
| 2019/0228211 A1* | 7/2019 | Chen | G06V 40/174 |
| 2020/0110926 A1* | 4/2020 | Csillag | G06V 20/54 |
| 2020/0364502 A1 | 11/2020 | Li et al. | |

FOREIGN PATENT DOCUMENTS

| | | |
|---|---|---|
| CN | 102254192 A | 11/2011 |
| CN | 104899579 A | 9/2015 |
| CN | 108805185 A | 11/2018 |
| CN | 109522872 A | 3/2019 |
| CN | 110232678 A | 9/2019 |
| CN | 111340013 A | 6/2020 |

OTHER PUBLICATIONS

The World Intellectual Property Organization (WIPO) International Search Report for PCT/CN2021/085978 dated Jun. 28, 2021 6 Pages (including translation).

* cited by examiner

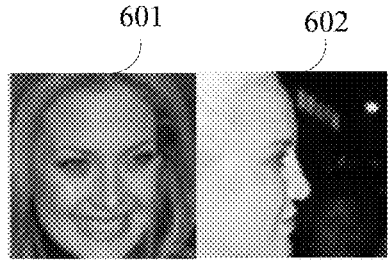
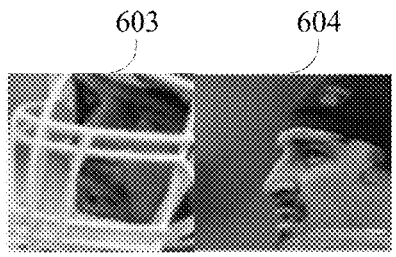

Detection result of the related art:
$\cos\theta_1 = 0.127 < 0.179$
Detection result of this application:
$k_1 = 970.013 \quad k_2 = 412.385$
$s(x_1, x_2) = -1364.021 > -1373.377$ Detection result of the related art:
$\cos\theta_2 = 0.102 < 0.179$
Detection result of this application:
$k_3 = 401.687 \quad k_4 = 877.605$
$s(x_3, x_4) = -1368.452 > -1373.377$

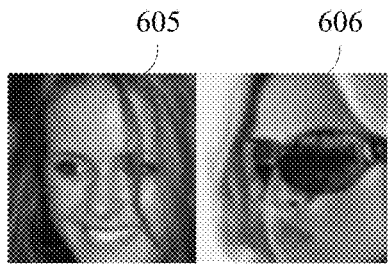
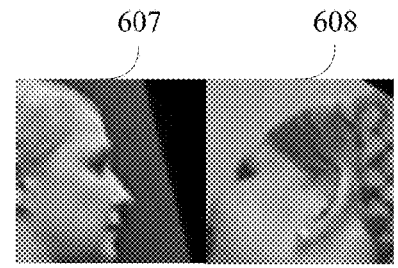

Detection result of the related art:
$\cos\theta_3 = 0.154 < 0.179$
Detection result of this application:
$k_5 = 1018.599 \quad k_6 = 565.877$
$s(x_5, x_6) = -1365.027 > -1373.377$ Detection result of the related art:
$\cos\theta_4 = 0.072 < 0.179$
Detection result of this application:
$k_7 = 523.347 \quad k_8 = 412.226$
$s(x_7, x_8) = -1367.089 > -1373.377$

FIG. 6

FACE RECOGNITION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2021/085978, entitled "FACIAL RECOGNITION METHOD AND APPARATUS, COMPUTER DEVICE, AND STORAGE MEDIUM" and filed on Apr. 8, 2021, which claims priority to Chinese Patent Application No. 202010438831.2, entitled "FACE RECOGNITION METHOD AND APPARATUS, COMPUTER DEVICE, AND STORAGE MEDIUM" and filed with the China National Intellectual Property Administration on May 22, 2020, the entire contents of both of which are incorporated herein by reference.

FIELD OF THE TECHNOLOGY

Embodiments of the present disclosure relate to the field of computer technologies, and in particular, to a face recognition method and apparatus, a computer device, and a storage medium.

BACKGROUND OF THE DISCLOSURE

Face recognition is a biometric identification technology based on human face features. With the rapid development of artificial intelligence (AI) technologies, face recognition based on AI is widely applied in daily life, realizing the monitoring of user identity in scenarios such as payment through face recognition and applications logged in through face recognition. In the scenarios such as payment through face recognition and applications logged in through face recognition, the security of identity verification cannot be ensured due to the inaccuracy of face recognition. Therefore, how to improve the accuracy of face recognition has become an urgent problem to be resolved.

SUMMARY

Embodiments of the present disclosure provide a face recognition method and apparatus, a computer device, and a storage medium, which can improve the accuracy of face recognition. The technical solutions include the following content.

In one aspect, a face recognition method is provided, including: performing feature extraction on a target face image, to obtain a first feature image corresponding to the target face image and a first feature vector corresponding to the first feature image, the first feature image representing a face feature of the target face image; processing the first feature image, to obtain a first feature value corresponding to the first feature image, the first feature value representing a degree of difference between a face feature included in the first feature image and a face feature of the target face image; obtaining a similarity between the target face image and a template face image according to the first feature vector, the first feature value, a second feature vector, and a second feature value, the second feature vector being a feature vector corresponding to a second feature image of the template face image, the second feature value being a feature value corresponding to the second feature image, the second feature value representing a degree of difference between a face feature included in the second feature image and a face feature of the template face image; and determining, when the similarity is greater than a preset threshold, that the target face image matches the template face image.

In another aspect, a face recognition apparatus is provided, including: a feature extraction module, configured to perform feature extraction on a target face image, to obtain a first feature image corresponding to the target face image and a first feature vector corresponding to the first feature image, the first feature image representing a face feature of the target face image; a feature value obtaining module, configured to process the first feature image, to obtain a first feature value corresponding to the first feature image, the first feature value representing a degree of difference between a face feature included in the first feature image and a face feature of the target face image; a similarity obtaining module, configured to obtain a similarity between the target face image and a template face image according to the first feature vector, the first feature value, a second feature vector, and a second feature value, the second feature vector being a feature vector corresponding to a second feature image of the template face image, the second feature value being a feature value corresponding to the second feature image, the second feature value representing a degree of difference between a face feature included in the second feature image and a face feature of the template face image; and a determining module, configured to determine, when the similarity is greater than a preset threshold, that the target face image matches the template face image.

In another aspect, a computer device is provided, including a processor and a memory, the memory storing at least one instruction, the at least one instruction being loaded and executed by the processor to implement the face recognition method.

In a further aspect, a non-transitory computer-readable storage medium, storing at least one instruction, the at least one instruction being loaded and executed by a processor to implement the face recognition method.

The embodiments of the present disclosure provide a method and apparatus, a computer device, and a storage medium, including obtaining a first feature image corresponding to a target face image and a first feature vector and a first feature value corresponding to the first feature image, obtaining a similarity between the target face image and a template face image according to the first feature vector, the first feature value, and a second feature vector and a second feature value corresponding to a second feature image of the template face image, and determining, when the similarity is greater than a preset threshold, that the target face image matches the template face image. The first feature value represents uncertainty corresponding to the first feature image, the second feature value represents uncertainty corresponding to the second feature image, and the uncertainty can represent a degree of difference between a feature image and a face image. Therefore, when the similarity between the target face image and the template face image is obtained, the influence of the uncertainty of the feature image on the similarity is also considered, rather than only considering a feature vector corresponding to the feature image, which can effectively reduce the situation that the feature vector cannot accurately represent a face feature due to interference factors in the face image, can improve the accuracy of face recognition, and reduce a misjudgment rate of face recognition.

In addition, in the embodiments of the present disclosure, a feature of the target face image is mapped to a hyperspherical space, to obtain the first feature image corresponding to the target face image. Compared with a two-dimensional Euclidean space, the hyperspherical space is more conformable to a feature space of a face. Therefore, performing feature extraction on the face in the hyperspherical space can make an extracted face feature more accurate, and can further improve the accuracy of face recognition.

In addition, sample face images and sample feature vectors corresponding to the sample face images are obtained, a prediction feature image and a prediction feature vector of the sample face image are extracted by invoking a feature extraction submodel, and the feature extraction submodel is trained according to a difference between the prediction feature vector and the sample feature vector. A center feature vector of a face identifier to which the sample face image belongs is obtained, a prediction feature value corresponding to the prediction feature image is obtained by invoking a prediction submodel, and a third loss value is obtained according to the prediction feature vector, the center feature vector, and the prediction feature value, and the prediction submodel is trained according to the third loss value. Subsequently, face recognition can be performed by a face recognition model including a feature extraction submodel and a prediction submodel. Because the prediction submodel is introduced, when the similarity between the target face image and the template face image is obtained, the influence of a feature value outputted by the prediction submodel on the similarity is also considered, that is, the influence of the uncertainty of the feature image on the similarity is considered, rather than only considering the feature vector corresponding to the feature image, which can effectively reduce the situation that the feature vector cannot accurately represent a feature of a face due to interference factors in the face image, can improve the accuracy of face recognition, and reduce a misjudgment rate of face recognition.

In addition, the feature extraction submodel is trained according to the sample face image and the sample feature vector corresponding to the sample face image. In a case of keeping the trained feature extraction submodel unchanged, the prediction submodel is trained according to the sample feature vector and the center feature vector of the face identifier to which the sample face image belongs. Therefore, in some embodiments, a training process of the face recognition model is divided into a training stage of the feature extraction submodel and a training stage of the prediction submodel. When the feature extraction submodel is trained, the prediction submodel is trained by obtaining the sample face image for training the feature extraction submodel and without retraining a new feature extraction submodel or re-acquiring sample face images.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the embodiments of the present disclosure, and a person of ordinary skill in the art may still derive other accompanying drawings from the accompanying drawings without creative efforts.

FIG. 6 shows a result of face recognition provided in an embodiment of the present disclosure and a result of face recognition provided in the related art.

DESCRIPTION OF EMBODIMENTS

Figure 1:
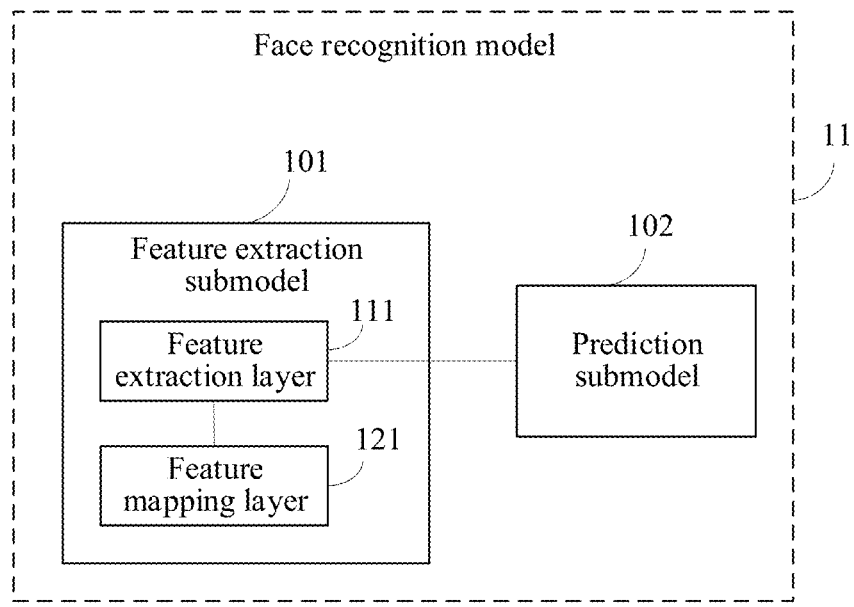
FIG. 1 is a schematic diagram of a face recognition model according to an embodiment of the present disclosure.

To make objectives, technical solutions, and advantages of the embodiments of the present disclosure clearer, the following further describes in detail implementations of the present disclosure with reference to the accompanying drawings.

The terms "first", "second", and the like used in the present disclosure may be used for describing various concepts in this specification. However, the concepts are not limited by the terms unless otherwise specified. The terms are merely used for distinguishing one concept from another concept. For example, without departing from the scope of the present disclosure, in some embodiments, a first feature image is referred to as a second feature image, and similarly, the second feature image is referred to as the first feature image. "A plurality of" refers to two or more. For example, a plurality of face images are any integral quantity of face images greater than or equal to two, such as two face images and three face images. "Each" refers to each of at least one. For example, each face identifier refers to each face identifier in a plurality of face identifiers. If the plurality of face identifiers are three face identifiers, each face identifier refers to each face identifier in the three face identifiers.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that can respond in a manner similar to human intelligence. AI is to study design principles and implementation methods of various intelligent machines, so that the machines have the functions of perception, reasoning, and decision-making.

The AI technology is a comprehensive discipline, covering a wide range of fields, and including both a hardware-level technology and a software-level technology. Basic AI technologies generally include technologies such as sensor, dedicated AI chip, cloud computing, distributed storage, a big data processing technology, operation/interaction system, and mechatronics. AI software technologies include a natural language processing technology and machine learning (ML).

ML is an interdisciplinarity involving a plurality of disciplines such as the probability theory, statistics, approximation theory, convex analysis, algorithm complexity theory, and the like. ML specializes in studying how a computer simulates or implements a human learning behavior to obtain new knowledge or skills, and reorganize an existing knowledge structure, so as to keep improving performance of the computer. ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

Computer vision (CV) technologies is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, video processing, video semantic understanding, video content/behavior recognition, three-dimensional object reconstruction, virtual reality, augmented reality, synchronous positioning, and map construction, and further include biometric feature recognition technologies such as common face recognition and fingerprint recognition.

The face recognition method provided in the embodiments of the present disclosure relates to the AI technology and the CV technology, and is described through the face recognition method provided in the following embodiments.

The embodiments of the present disclosure provide a face recognition method, and the face recognition method is performed by a computer device. The computer device invokes a face recognition model to recognize a face in a face image. In one embodiment, the computer device is a terminal, and the terminal is a smartphone, a tablet computer, a notebook computer, a desktop computer, a smart speaker, a smart watch, or the like. In another embodiment, the computer device is a server, and the server is an independent physical server, or the server is a server cluster or a distributed system including a plurality of physical servers, or the server is a cloud server that provides a basic cloud computing service such as cloud storage, a network service, cloud communication, a security service, a content delivery network (CDN), big data, and an AI platform.

The method provided in the embodiments of the present disclosure can be applied to any scenario of face recognition. For example, in a scenario online payment through face recognition, a terminal pre-stores a template face image of a user. When detecting that online payment is to be made, the terminal needs to verify the identity of the current user, and the terminal acquires a current inputted target face image, respectively processes, through the following steps 401 to 408, the acquired target face image and the pre-stored template face image by invoking a face recognition model provided in the embodiments of the present disclosure, obtains a similarity between the target face image and the template face image, determines, when the similarity is greater than a preset threshold, that the target face image matches the template face image, that is, a user corresponding to the target face image is the user corresponding to the template face image, and when the identity verification of the current user is successful, the current user has a permission to complete online payment, and determines, when the similarity is not greater than the preset threshold, the target face image does not match the template face image, that is, the user corresponding to the target face image is not the user corresponding to the template face image, and when the identity verification of the current user fails, the online payment fails. In addition, in some other embodiments, the face recognition method provided in the embodiments of the present disclosure is applied to an access control system, an application that completes login through face recognition, an another system that requires face recognition to authenticate a user identity, or the like, to verify the user identity through face recognition.

In one embodiment, as shown in FIG. 1, a face recognition model 11 provided in the embodiments of the present disclosure includes a feature extraction submodel 101 and a prediction submodel 102. The feature extraction submodel 101 is connected to the prediction submodel 102. The feature extraction submodel 101 is configured to extract a feature image and a feature vector corresponding to a face image, and the prediction submodel 102 is configured to obtain a corresponding feature value according to the feature image.

In some embodiments, the feature extraction submodel 101 includes a feature extraction layer 111 and a feature mapping layer 121. The feature extraction layer 111 is connected to the feature mapping layer 121. The feature extraction layer 111 is configured to extract a corresponding feature image according to the face image, and the feature mapping layer 121 is configured to obtain a corresponding feature vector according to the feature image.

Figure 2:
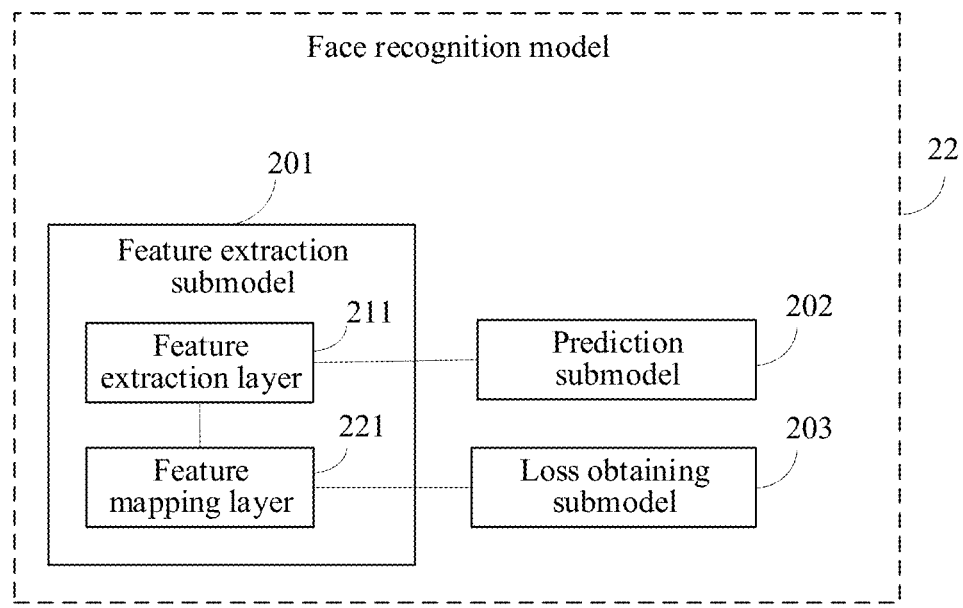
FIG. 2 is a schematic diagram of another face recognition model according to an embodiment of the present disclosure.

In another embodiment, as shown in FIG. 2, a face recognition model 22 provided in the embodiments of the present disclosure includes a feature extraction submodel 201, a prediction submodel 202, and a loss obtaining submodel 203.

The feature extraction submodel 201 is connected to the prediction submodel 202. The feature extraction submodel 201 is further connected to the loss obtaining submodel 203. The feature extraction submodel 201 is configured to extract a feature image and a feature vector corresponding to a face image, the prediction submodel 202 is configured to obtain a corresponding feature value according to the feature image, and the loss obtaining submodel 203 is configured to obtain a corresponding loss value according to the feature vector.

In some embodiments, the feature extraction submodel 201 includes a feature extraction layer 211 and a feature mapping layer 221. The feature extraction layer 211 is connected to the feature mapping layer 221. The feature extraction layer 211 is configured to extract a corresponding feature image according to the face image, and the feature mapping layer 221 is configured to obtain a corresponding feature vector according to the feature image.

Figure 3:
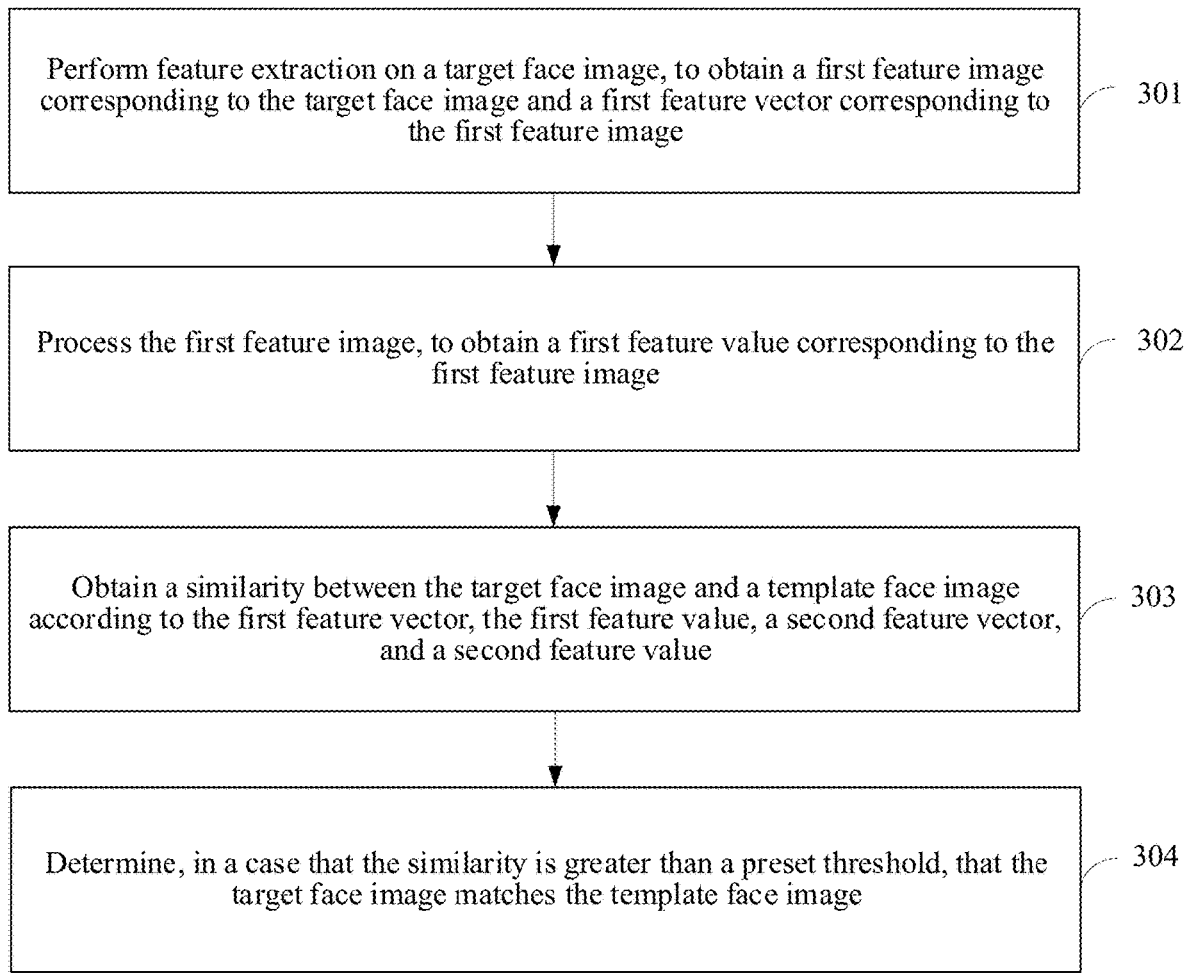
FIG. 3 is a flowchart of a face recognition method according to an embodiment of the present disclosure.

FIG. 3 is a flowchart of a face recognition method according to an embodiment of the present disclosure. This embodiment of the present disclosure is performed by a computer device. Referring to FIG. 3, the method includes the following steps.

301. Perform feature extraction on a target face image, to obtain a first feature image corresponding to the target face image and a first feature vector corresponding to the first feature image.

When obtaining the target face image, the computer device performs feature extraction on the target face image, to obtain the first feature image corresponding to the target face image and the first feature vector corresponding to the first feature image.

The first feature image is an image representing a face feature of the target face image, for example, the face feature of the face image includes a depth feature, a texture feature, a color feature, or the like of the face image. The first feature vector is a vector representing a feature of the target face image, for example, the first feature vector is a multi-dimensional vector.

302. Process the first feature image, to obtain a first feature value corresponding to the first feature image.

When obtaining the first feature image corresponding to the target face image, the computer device processes the first feature image, to obtain the first feature value corresponding to the first feature image. The first feature value is used for representing uncertainty corresponding to the first feature image. The uncertainty refers to a degree of unreliability of a processing result due to errors in a processing process, which can represent, to some extent, a degree to which a first feature image can accurately describe a face feature, that is, the uncertainty corresponding to the first feature image is a degree of difference between a face feature included in the first feature image and a face feature of the target face image. A smaller first feature value indicates a higher degree of accuracy of the first feature image in describing the face feature of the target face image and a lower degree of difference between a face feature included in the first feature image and a face feature of the target face image; and a greater first feature value indicates a lower degree of accuracy of the first feature image in describing the face feature of the target face image and a greater degree of difference between the face feature included in the first feature image and the face feature of the target face image.

303. Obtain a similarity between the target face image and a template face image according to the first feature vector, the first feature value, a second feature vector, and a second feature value.

The face recognition process in this embodiment of the present disclosure is to recognize the target face image and the template face image to determine whether the target face image matches the template face image, where the template face image is a pre-stored face image, and the target face image is an image that is currently acquired and needs face recognition. To match the target face image with the template face image, the computer device obtains a second feature vector corresponding to a second feature image of the template face image and a second feature value corresponding to the second feature image, and obtains the similarity between the target face image and the template face image according to the first feature vector, the first feature value, the second feature vector, and the second feature value.

The second feature image is an image representing a feature of the template face image, and the second feature vector is a vector representing a feature of the template face image, that is, the second feature vector is a feature vector corresponding to the second feature image of the template face image. The second feature value is a feature value corresponding to the second feature image, the second feature value is used for representing uncertainty corresponding to the second feature image, and the uncertainty corresponding to the second feature image represents a degree to which the second feature image can accurately describe the face feature, that is, the uncertainty corresponding to the second feature image is a degree of difference between the face feature included in the second feature image and the face feature of the template face image.

A higher similarity between the target face image and the template face image indicates a greater probability that the target face image matches the template face image, and a lower similarity between the target face image and the template face image indicates a smaller probability that the target face image matches the template face image.

304. Determine, when the similarity is greater than a preset threshold, that the target face image matches the template face image.

When obtaining the similarity between the target face image and the template face image, the computer device compares the similarity and the preset threshold. If the similarity is greater than the preset threshold, it is determined that the target face image matches the template face image, and face recognition is successful. If the similarity is not greater than the preset threshold, it is determined that the target face image does not match the template face image, and the target face image is then matched with a next template face image until it is determined that the target face image matches a specific template face image, and face recognition is successful, or until it is determined that the target face image matches none of the stored template face images, and the face recognition fails. The preset threshold is set by default by the computer device, or the preset threshold is set by a developer through the computer device.

The method provided in this embodiment of the present disclosure includes: obtaining a first feature image corresponding to a target face image and a first feature vector and a first feature value corresponding to the first feature image, obtaining a similarity between the target face image and a template face image according to the first feature vector, the first feature value, and a second feature vector and a second feature value corresponding to a second feature image of the template face image, and determining, when the similarity is greater than a preset threshold, that the target face image matches the template face image. The first feature value represents uncertainty corresponding to the first feature image, the second feature value represents uncertainty corresponding to the second feature image, and the uncertainty can represent a degree of difference between a feature image and a face image. Therefore, when the similarity between the target face image and the template face image is obtained, the influence of the uncertainty of the feature image on the similarity is also considered, rather than only considering a feature vector corresponding to the feature image, which can effectively reduce the situation that the feature vector cannot accurately represent a feature of a face due to interference factors in the face image, can improve the accuracy of face recognition, and reduce a misjudgment rate of face recognition.

Figure 4:
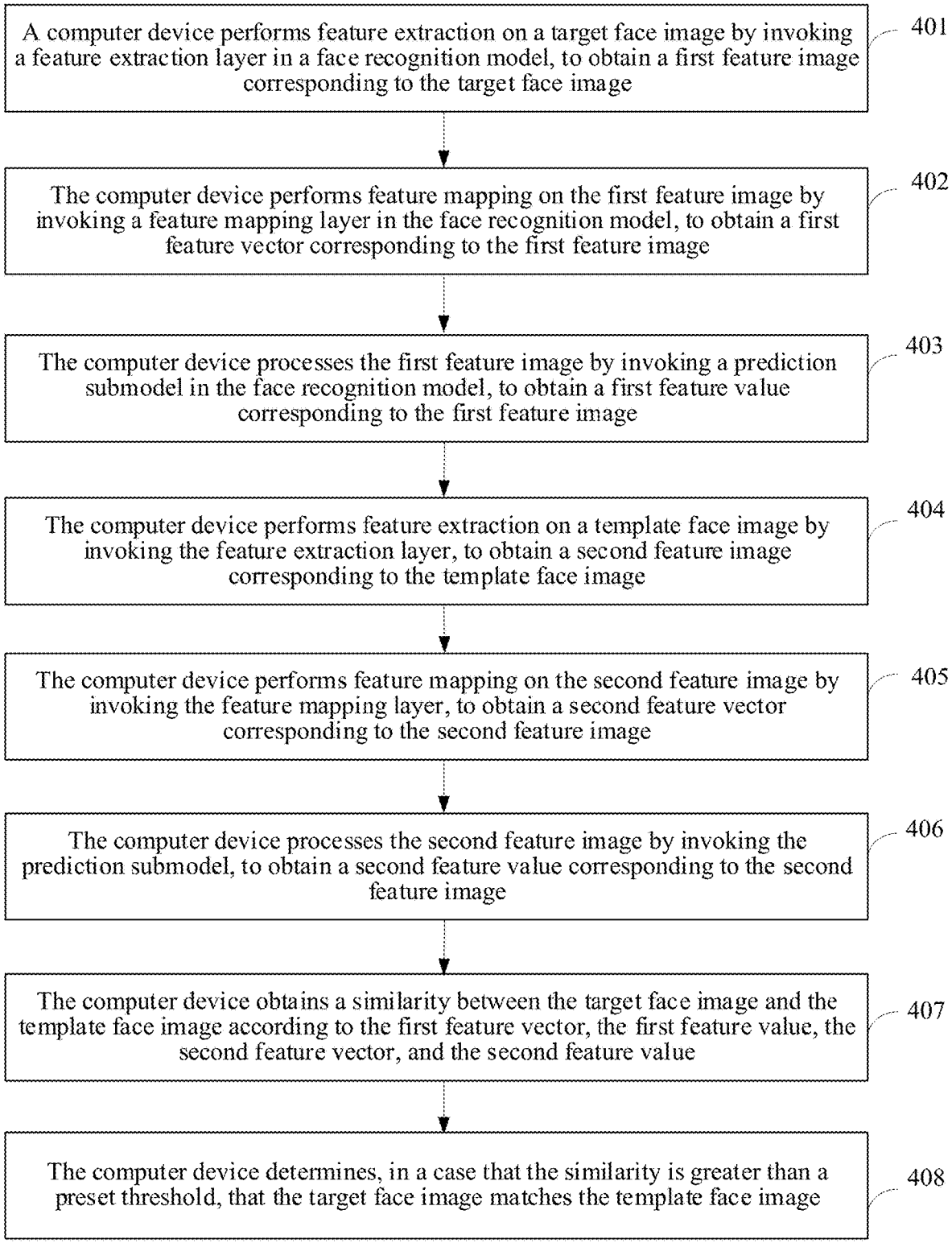
FIG. 4 is a flowchart of another face recognition method according to an embodiment of the present disclosure.

FIG. 4 is a flowchart of another face recognition method according to an embodiment of the present disclosure. This embodiment of the present disclosure is performed by a computer device. Referring to FIG. 4, the method includes the following steps.

401. A computer device performs feature extraction on a target face image by invoking a feature extraction layer in a face recognition model, to obtain a first feature image corresponding to the target face image.

The face recognition model is a model pre-trained by the computer device, or a model uploaded to the computer device after being trained by another device. For a structure and functions of each part of the face recognition model, reference may be made to FIG. 1, and details are not described herein again.

When obtaining a to-be-recognized target face image, the computer device performs feature extraction on the target face image by invoking the feature extraction layer in the face recognition model, to obtain a first feature image corresponding to the target face image. In the feature extraction layer in this embodiment of the present disclosure, a feature of the target face image can be mapped to a hyperspherical space, to obtain the first feature image corresponding to the target face image, so that features represented in the first feature image conform to the distribution of the hyperspherical space. The hyperspherical space is spherical space above two dimensions. In some embodiments, a radius of the hyperspherical space is set by default by the computer device. Compared with a two-dimensional Euclidean space, the hyperspherical space is more conformable to a feature space of a face. Therefore, performing feature extraction on the face image in the hyperspherical space can make an extracted face feature more accurate.

In one embodiment, the feature extraction layer is a convolutional neural network (CNN). The CNN can perform operations such as convolution calculation, nonlinear activation function (Relu) calculation, and pooling calculation. Alternatively, the feature extraction layer is a network in another form. This is not limited in this embodiment of the present disclosure.

The first feature image is an image representing a feature of the target face image, for example, the feature of the face image includes a depth feature, a texture feature, a color feature, or the like of the face image.

In one embodiment, the computer device acquires a face image in a current scene by using a configured camera, and uses the face image as the target face image, or performs cropping processing on the face image to obtain the target face image. In some embodiments, when face recognition is required, a user triggers an operation of face recognition, and the computer device detects the trigger operation for face recognition and shoots by using the configured camera, to obtain the target face image including the face.

In another embodiment, the computer device obtains a target face image uploaded by another device, or the computer device downloads the target face image from another device, or obtains the target face image in another manner. This is not limited in this embodiment of the present disclosure.

402. The computer device performs feature mapping on the first feature image by invoking a feature mapping layer in the face recognition model, to obtain a first feature vector corresponding to the first feature image.

In some embodiments, the feature mapping layer is a fully connected mapping network, or the feature mapping layer is a network in another form. This is not limited in this embodiment of the present disclosure.

When obtaining the first feature image corresponding to the target face image, the computer device performs feature mapping on the first feature image by invoking the feature mapping layer in the face recognition model, to obtain the first feature vector corresponding to the first feature image.

The first feature vector is obtained by mapping the first feature image, and the first feature vector is a vector used for representing the feature of the target face image. In some embodiments, the first feature vector is a multi-dimensional vector. For example, the first feature vector is a 1×n-dimensional vector, and the first feature vector includes feature values of n dimensions.

In this embodiment of the present disclosure, a feature extraction submodel in the face recognition model includes a feature extraction layer and a feature mapping layer. Therefore, in steps 401 and 402, a process of obtaining the first feature image corresponding to the target face image and the first feature vector corresponding to the first feature image is described by using an example in which the target face image is processed by using the feature extraction layer and the first feature image is processed by using the feature mapping layer. However, in another embodiment, the feature extraction submodel is a submodel in another form, so that the first feature image and the first feature vector can be obtained by invoking the feature extraction submodel to perform feature extraction on the target face image.

403. The computer device processes the first feature image by invoking a prediction submodel in the face recognition model, to obtain a first feature value corresponding to the first feature image.

In this embodiment of the present disclosure, the prediction submodel is connected to the feature extraction layer in the feature extraction submodel. In some embodiments, the prediction submodel is a CNN, and the CNN is a network in which a plurality of fully connected layers are connected, or the CNN is a network in a form of a residual network (ResNet). This is not limited in this embodiment of the present disclosure.

When obtaining the first feature image corresponding to the target face image, the computer device processes the first feature image by invoking the prediction submodel, to obtain the first feature value corresponding to the first feature image. The first feature value is used for representing uncertainty of a face feature of the target face image described by the first feature image. For related content of the uncertainty, reference is made to step 302. In some embodiments, the first feature image is a feature image of a face image mapped in a hyperspherical space, the features represented in the first feature image conform to the distribution of the hyperspherical space, and the first feature value is also a first feature value that conforms to the distribution of the hyperspherical space and is used for representing the uncertainty of the face feature of the target face image described by the first feature image in the hyperspherical space.

In this embodiment of the present disclosure, an example in which step 402 is performed before step 403 is merely used for description, that is, the first feature vector corresponding to the first feature image is first obtained, and the first feature value corresponding to the first feature image is then obtained. In another embodiment, step 403 is performed before step 402, that is, the first feature value corresponding to the first feature image is first obtained, and the first feature vector corresponding to the first feature image is then obtained.

404. The computer device performs feature extraction on a template face image by invoking the feature extraction layer, to obtain a second feature image corresponding to the template face image.

The face recognition process in this embodiment of the present disclosure is to recognize the target face image and the template face image to determine whether the target face image matches the template face image, where the template face image is a face image pre-stored by the computer device, and the target face image is an image that is currently acquired by the computer device and needs face recognition. The matching between the target face image and the template face image means that a face in the target face image and a face in the template face image belong to the same person. An example in which an application logged in with face recognition runs on a computer device is used. When a user registers an account in the application, the user enters a face image, and the computer device stores the face image as a template face image. When the account is subsequently logged in through the application, the user identity can be verified according to the template face image. Alternatively, an example in which online payment is performed through face recognition is used. When a user sets face recognition as a verification manner for online payment, the user enters a face image, and the computer device uses the face image as a template face image for storage. When the online payment is performed subsequently, the user identity can be verified according to the template face image. Alternatively, an example in which a user identity is verified by an access control system through face recognition is used. When a user sets face recognition verification as a verification manner for an access control system, the user enters a face image, and a computer device corresponding to the access control system uses the face image as a template face image for storage. When the face recognition verification is performed subsequently, the user identity can be verified according to the template face image.

Therefore, the computer device obtains the pre-stored template face image, and performs feature extraction on the template face image by invoking the feature extraction layer in the face recognition model, to obtain the second feature image corresponding to the template face image, where the second feature image is an image representing a feature of the template face image. In the feature extraction layer in this embodiment of the present disclosure, the feature of the template face image can be mapped to a hyperspherical space, to obtain the second feature image corresponding to the template face image. The hyperspherical space in step 404 is the same as the hyperspherical space in step 401.

405. The computer device performs feature mapping on the second feature image by invoking the feature mapping layer, to obtain a second feature vector corresponding to the second feature image.

When obtaining the second feature image corresponding to the template face image, the computer device performs feature mapping on the second feature image by invoking the feature mapping layer in the face recognition model, to obtain the second feature vector corresponding to the second feature image. The second feature vector is a vector used for representing the feature of the template face image. In some embodiments, the second feature vector is a multi-dimensional vector. For example, the second feature vector is a 1×n-dimensional vector, and the second feature vector includes feature values of n dimensions. The second feature vector is obtained by mapping the second feature image.

In this embodiment of the present disclosure, the feature extraction submodel in the face recognition model includes the feature extraction layer and the feature mapping layer. Therefore, in steps 404 and 405, a process of obtaining the second feature image corresponding to the template face image and the second feature vector corresponding to the second feature image is described by using an example in which the template face image is processed by using the feature extraction layer and the second feature image is processed by using the feature mapping layer. However, in another embodiment, the feature extraction submodel is a submodel in another form, so that the second feature image and the second feature vector can be obtained by using the feature extraction submodel to perform feature extraction on the template face image.

406. The computer device processes the second feature image by invoking the prediction submodel, to obtain a second feature value corresponding to the second feature image.

The second feature value is used for representing uncertainty of a face feature of the template face image described by the second feature image. An implementation process and related content in step 406 are similar to that in step 403. Details are not described herein.

In this embodiment of the present disclosure, an example in which step 405 is performed before step 406 is merely used for description, that is, the second feature vector corresponding to the second feature image is first obtained, and the second feature value corresponding to the second feature image is then obtained. In another embodiment, step 406 is performed before step 405, that is, the second feature value corresponding to the second feature image is first obtained, and the second feature vector corresponding to the second feature image is then obtained.

In this embodiment of the present disclosure, an example in which steps 401 to 403 are performed before steps 404 to 406 is merely used for description. In another embodiment, steps 404 to 406 are performed before steps 401 to 403. Alternatively, the computer device pre-processes the template face image before this face recognition, to obtain the second feature vector and the second feature value corresponding to the template face image, and stores the second feature vector and the second feature value, so that the computer device directly obtains the second feature vector and the second feature value without performing steps 404 to 406. Alternatively, after obtaining a to-be-recognized target face image, the computer device obtains the pre-stored template face image, and inputs the target face image and the template face image into the face recognition model in a form of an image pair, for the face recognition model to respectively process the target face image and the template face image, to obtain the first feature vector, the first feature value, the second feature vector, and the second feature value. Submodels of the face recognition model can process the target face image and the template face image in parallel. For example, when the feature extraction model in the face recognition model processes the target face image, the prediction submodel in the face recognition model can process the template face image, to implement parallel processing on the target face image and the template face image, thereby improving processing efficiency of the face recognition model.

407. The computer device obtains a similarity between the target face image and the template face image according to the first feature vector, the first feature value, the second feature vector, and the second feature value.

When obtaining the first feature vector, the first feature value, the second feature vector, and the second feature value, the computer device obtains the similarity between the target face image and the template face image according to the first feature vector, the first feature value, the second feature vector, and the second feature value. A higher similarity between the target face image and the template face image indicates a greater probability that the face in the target face image and the face in the template face image belong to the same person, that is, a greater probability that the target face image matches the template face image. A lower similarity between the target face image and the template face image indicates a smaller probability that the face in the target face image and the face in the template face image belong to the same person, that is, a smaller probability that the target face image matches the template face image.

In one embodiment, the computer device calculates the first feature vector, the first feature value, the second feature vector, and the second feature value by using a similarity algorithm, to obtain the similarity between the target face image and the template face image. In some embodiments, the similarity algorithm is as follows:

Sim=log $C_d(k_i)$+log $C_d(k_j)$−log $C_d(\tilde{k})$−d·log r, where Sim represents the similarity between the target face image and the template face image, $k_i$ represents a first feature value corresponding to the target face image, and $k_j$ represents a second feature value corresponding to the template face image, i and j being positive integers and used for indicating the target face image or the template face image, d representing a dimension of a feature vector outputted by the feature mapping layer, and r representing a radius in a hyperspherical space to which a feature of the face image is mapped.

$$C_d(k) = \frac{k^{\frac{d}{2}-1}}{I_{\frac{d}{2}-1}(k) \cdot (2\pi)^{d/2}};$$

where $\tilde{k}=\|p\|$, and $p=k_i \cdot \mu_i + k_j \cdot \mu_j$, $\mu_i$ representing a first feature vector corresponding to the target face image, and $\mu_j$ representing a second feature vector corresponding to the template face image.

$$I_{\frac{d}{2}-1}(k)$$

is a Bessel function, and the Bessel function is $$I_\alpha(x) = \sum_{m=0}^{\infty} \frac{1}{m! \Gamma(m+\alpha+1)} \cdot \left(\frac{x}{2}\right)^{2m+\alpha},$$

where x represents the target face image, m and $\alpha$ are both preset parameters of the Bessel function, m! represents a factorial of m, and $\Gamma(\cdot)$ represents a gamma function.

408. The computer device determines, when the similarity is greater than a preset threshold, that the target face image matches the template face image.

When obtaining the similarity between the target face image and the template face image, the computer device compares the similarity and the preset threshold. If the similarity is greater than the preset threshold, it is determined that the face in the target face image the face in the template face image belong to the same person, that is, the target face image matches the template face image. If the similarity is not greater than the preset threshold, it is determined that the face in the target face image the face in the template face image do not belong to the same person, that is, the target face image does not match the template face image. The preset threshold is determined according to a false positive rate of face recognition required in an actual application scenario, or the preset threshold is set by default by the computer device, or the preset threshold is set by a developer through the computer device.

In one embodiment, the computer device determines the similarity by using a determining algorithm, to determine whether the target face image matches the template face image. In some embodiments, the determining algorithm is as follows:

$$L_{out} = \begin{cases} \text{match;} & \text{if } Sim \geq th \\ \text{not match;} & \text{if } Sim < th \end{cases};$$

$L_{out}$ is a determining result of the computer device, and th is the preset threshold.

In this embodiment of the present disclosure, the face recognition process is described by merely using an example in which the computer device recognizes a target face image and a template face image. In another embodiment, the computer device stores a plurality of template face images, and after recognizing a to-be-recognized target face image, the computer device traverses the plurality of template face images, performs the steps of the embodiment shown in FIG. 4 for each traversed template face image until it is determined that the target face image matches a specific template face image in the plurality of template face images, or until it is determined that the target face image does not match any template face image in the plurality of template face images.

Figure 5:
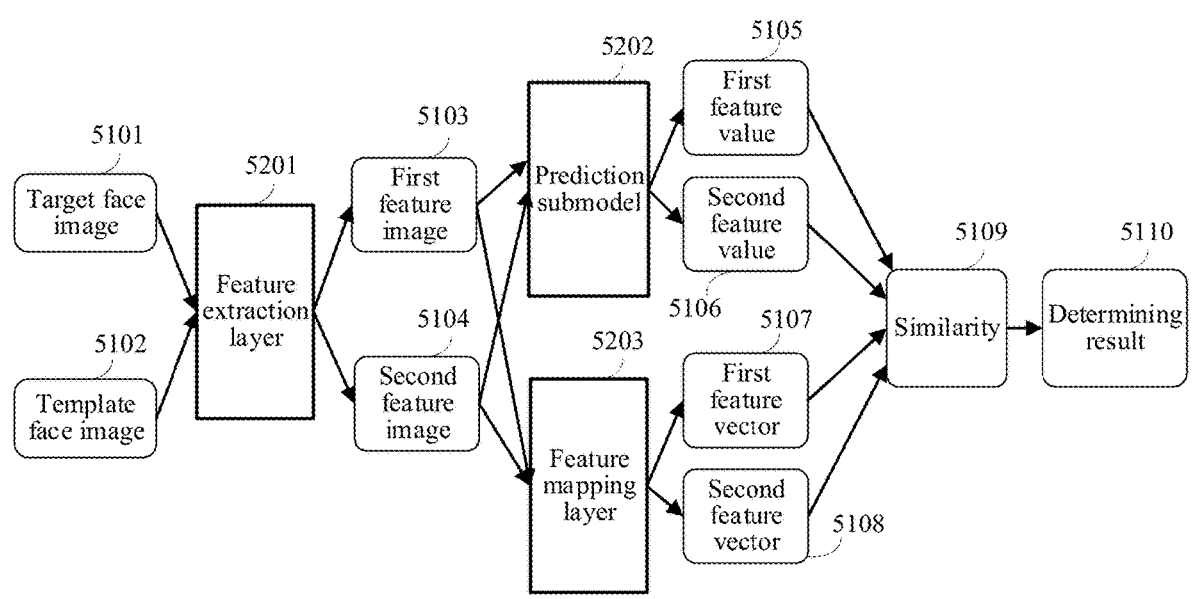
FIG. 5 is a flowchart of another face recognition method according to an embodiment of the present disclosure.

FIG. 5 is a flowchart of another face recognition method according to an embodiment of the present disclosure. Referring to FIG. 5, a target face image 5101 is inputted into a feature extraction layer 5201, to obtain a first feature image 5103, and a template face image 5102 is inputted into the feature extraction layer 5201, to obtain a second feature image 5104.

The first feature image 5103 is inputted into a prediction submodel 5202, to obtain a first feature value 5105, and the second feature image 5104 is inputted into the prediction submodel 5202, to obtain a second feature value 5106.

The first feature image 5103 is inputted into a feature mapping layer 5203, to obtain a first feature vector 5107, and the second feature image 5104 is inputted into the feature mapping layer 5203, to obtain a second feature vector 5108.

A similarity 5109 between the target face image 5101 and the template face image 5102 is obtained according to the first feature value 5105, the second feature value 5106, the first feature vector 5107, and the second feature vector 5108, and a recognition result 5110 is obtained according to the similarity 5109, that is, when the similarity 5109 is greater than a preset threshold, the recognition result 5110 is that the target face image 5101 matches the template face image 5102, and when the similarity 5109 is not greater than the preset threshold, the recognition result 5110 is that the target face image 5101 does not match the template face image 5102. In some embodiments, the template face image corresponds to a face identifier, and the face identifier is used for representing a user identity. When the recognition result 5110 is that the target face image 5101 matches the template face image 5102, the recognition result 5110 further includes a face identifier corresponding to the template face image 5102, to represent that the target face image 5101 is a face image of a user corresponding to the face identifier.

In the related art, during face recognition, a first feature vector corresponding to an acquired target face image and a second feature vector corresponding to a template face image are respectively extracted by invoking a face recognition model. A similarity between the target face image and the template face image is obtained according to the first feature vector and the second feature vector, and whether the target face image matches the template face image is determined according to the similarity, to determine whether face recognition is successful. However, due to interference factors in the face image, such as a shelter existing in the face image or the face image being relatively blurry, an extracted feature vector is not accurate enough, which leads to a relatively low accuracy of face recognition.

FIG. 6 shows results of face recognition performed according to a method provided in an embodiment of the present disclosure and a method provided in the related art. Referring to FIG. 6, a face image 601 matches a face image 602, a face image 603 matches a face image 604, a face image 605 matches a face image 606, and a face image 607 matches a face image 608. A preset threshold in the related art is 0.179, and a preset threshold in the present disclosure is −1373.377.

A similarity between the face image 601 and the face image 602 obtained in the method of the related art is cos $\theta_1$=0.127<0.179, so that it is determined that the face image 601 does not match the face image 602, and recognition fails. In the method of this embodiment of the present disclosure, a feature value of the face image 601 obtained is $k_1$=970.013, a feature value of the face image 602 obtained is $k_2$=412.385, and a similarity between the face image 601 and the face image 602 is $s(x_1, x_2)$=−1364.021>−1373.377, so that it is determined that the face image 601 matches the face image 602, and the recognition is successful. A similarity between the face image 603 and the face image 604 obtained in the method of the related art is cos $\theta_2$=0.102<0.179, so that it is determined that the face image 603 does not match the face image 604, and recognition fails. In the method of this embodiment of the present disclosure, a feature value of the face image 603 obtained is $k_3$=401.687, a feature value of the face image 604 obtained is $k_4$=877.605, and a similarity between the face image 603 and the face image 604 is $s(x_3, x_4)$=−1368.452>−1373.377, so that it is determined that the face image 603 matches the face image 604, and the recognition is successful. A similarity between the face image 605 and the face image 606 obtained in the method of the related art is cos $\theta_3$=0.154<0.179, so that it is determined that the face image 605 does not match the face image 606, and recognition fails. In the method of this embodiment of the present disclosure, a feature value of the face image 605 obtained is $k_5$=1018.599, a feature value of the face image 606 obtained is $k_6$=565.877, and a similarity between the face image 605 and the face image 606 is $s(x_5, x_6)$=−1365.027>−1373.377, so that it is determined that the face image 605 matches the face image 606, and the recognition is successful. A similarity between the face image 607 and the face image 608 obtained in the method of the related art is cos $\theta_4$=0.072<0.179, so that it is determined that the face image 607 does not match the face image 608, and recognition fails. In the method of this embodiment of the present disclosure, a feature value of the face image 607 obtained is $k_7$=523.347, a feature value of the face image 608 obtained is $k_8$=412.226, and a similarity between the face image 607 and the face image 608 is $s(x_7, x_8)$=−1367.089>−1373.377, so that it is determined that the face image 607 matches the face image 608, and the recognition is successful. According to the foregoing recognition results, it can be learned that, compared with the related art, the accuracy of face recognition can be improved by using the method provided in the embodiments of the present disclosure for face recognition.

In this embodiment of the present disclosure, an example in which the computer device processes an image by invoking a feature extraction submodel and a prediction submodel in a face recognition model is used for description. In another embodiment, the computer device performs feature extraction on the target face image in another manner, to obtain a first feature image corresponding to the target face image and a first feature vector corresponding to the first feature image, and processes the first feature image to obtain a first feature value corresponding to the first feature image.

In the method provided in this embodiment of the present disclosure, the first feature vector and the first feature value corresponding to the first feature image are obtained by invoking the feature extraction submodel and the prediction submodel in the face recognition model, and a similarity between the target face image and the template face image is obtained according to the first feature vector, the first feature value, and a second feature vector and a second feature value corresponding to a template face image. When the similarity is greater than a preset threshold, it is determined that the target face image matches the template face image. The first feature value represents uncertainty corresponding to the first feature image, the second feature value represents uncertainty corresponding to the second feature image, and the uncertainty can represent a degree of difference between a feature image and a face image. Therefore, when the similarity between the target face image and the template face image is obtained, the influence of the uncertainty of the feature image on the similarity is also considered, rather than only considering a feature vector corresponding to the feature image, which can effectively reduce the situation that the feature vector cannot accurately represent a feature of a face due to interference factors in the face image, can improve the accuracy of face recognition, and reduce a misjudgment rate of face recognition.

In addition, in the embodiments of the present disclosure, a feature of the target face image is mapped to a hyperspherical space, to obtain the first feature image corresponding to the target face image. Compared with a two-dimensional Euclidean space, the hyperspherical space is more conformable to a feature space of a face. Therefore, performing feature extraction on the face in the hyperspherical space can make an extracted face feature more accurate, and can further improve the accuracy of face recognition.

Before face recognition is performed by using the face recognition model, the face recognition model needs to be trained first, and a training process is shown in detail in an embodiment below.

Figure 7:
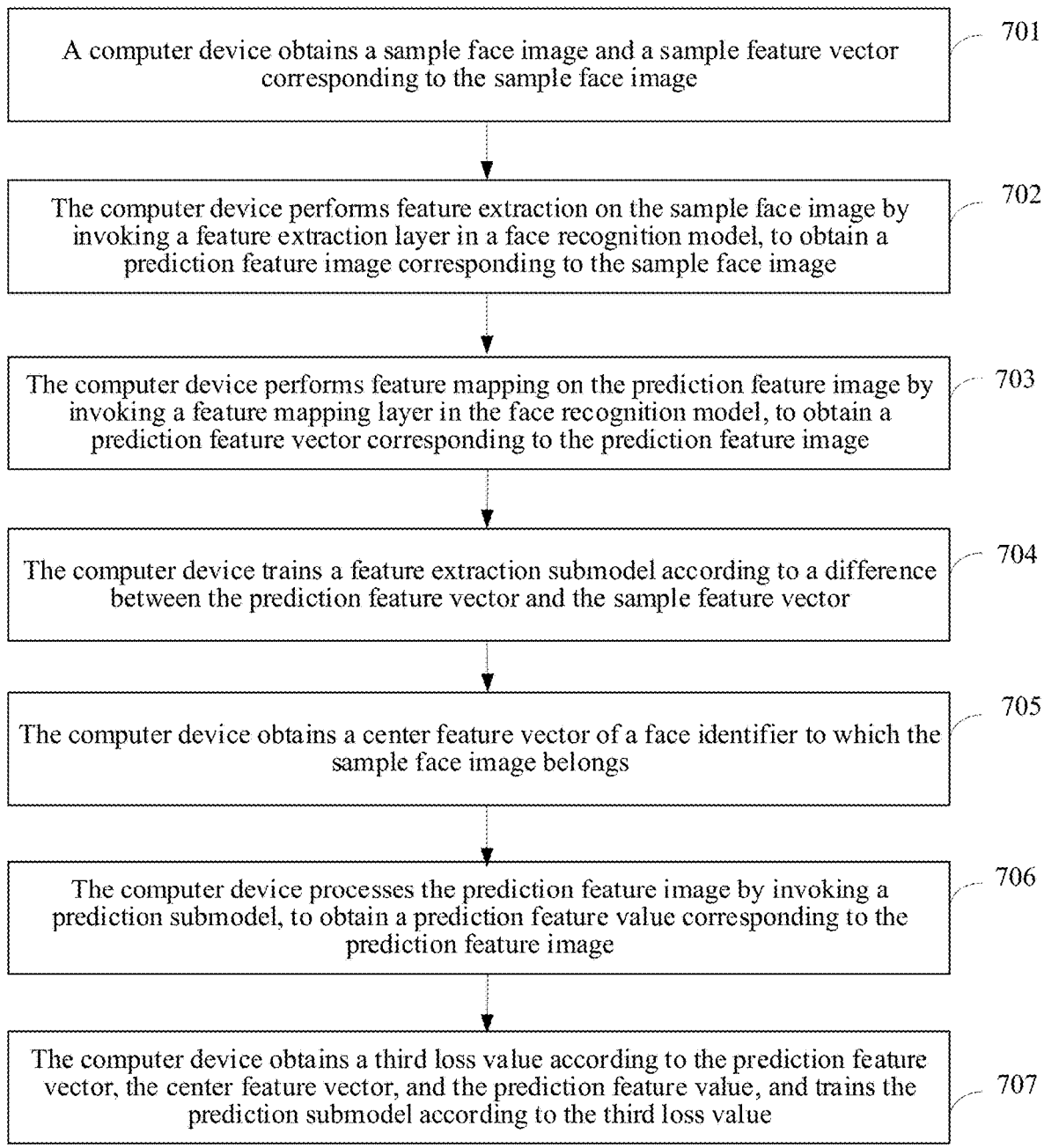
FIG. 7 is a flowchart of a method for training a face recognition model according to an embodiment of the present disclosure.

FIG. 7 is a flowchart of a method for training a face recognition model according to an embodiment of the present disclosure. This embodiment of the present disclosure is performed by a computer device. Referring to FIG. 7, the method includes the following steps.

701. The computer device obtains sample face images and sample feature vectors corresponding to the sample face images.

The computer device obtains the sample face image used for training the face recognition model and the sample feature vector corresponding to the sample face image. The sample face image is an image including a face, and the sample feature vector corresponding to the sample face image is a vector used for representing a feature of the sample face image. For example, the sample feature vector is used for representing a face identifier to which the sample face image belongs. A user 1 and a user 2 are used as an example. A sample feature vector corresponding to any sample face image including the face of the user 1 is a sample feature vector a, and a sample feature vector corresponding to any sample face image including the face of the user 2 is a sample feature vector b.

The sample face image is sample face images pre-stored in the computer device, or sample face images downloaded from another device by the computer device, or sample face images uploaded to the computer device by a developer or another device. The sample feature vector corresponding to the sample face image is a sample feature vector marked by the developer for the sample face image, or a sample feature vector obtained in another manner. This is not limited in this embodiment of the present disclosure.

702. The computer device performs feature extraction on the sample face image by invoking a feature extraction layer in a face recognition model, to obtain a prediction feature image corresponding to the sample face image.

The face recognition model is a model for performing face recognition. For a structure and functions of each part of the face recognition model, reference may be made to FIG. 1, and details are not described herein again. In one embodiment, the feature extraction layer is CNN. The CNN can perform operations such as convolution calculation, nonlinear activation function calculation, and pooling calculation. Alternatively, the feature extraction layer is a network in another form. This is not limited in this embodiment of the present disclosure.

When obtaining the sample face image, the computer device invokes the feature extraction layer in the face recognition model, and performs feature extraction on the sample face image, to obtain the prediction feature image corresponding to the sample face image. The prediction feature image is an image used for representing the feature of the sample face image.

In the feature extraction layer in this embodiment of the present disclosure, the feature of the sample face image is mapped to a hyperspherical space, to obtain the prediction feature image corresponding to the sample face image. The hyperspherical space is spherical space above two dimensions. Compared with a two-dimensional Euclidean space, the hyperspherical space is more conformable to a feature space of a face. Therefore, performing feature extraction on the face in the hyperspherical space can make an extracted face feature more accurate.

703. The computer device performs feature mapping on the prediction feature image by invoking a feature mapping layer in the face recognition model, to obtain a prediction feature vector corresponding to the prediction feature image.

In some embodiments, the feature mapping layer is a fully connected mapping network, or the feature mapping layer is a network in another form. This is not limited in this embodiment of the present disclosure.

When obtaining the prediction feature image corresponding to the sample face image, the computer device performs feature mapping on the prediction feature image by invoking the feature mapping layer in the face recognition model, to obtain the prediction feature vector corresponding to the prediction feature image. The prediction feature vector is a vector used for representing the feature of the sample face image, and the prediction feature vector is obtained by mapping the prediction feature image.

In this embodiment of the present disclosure, a feature extraction submodel in the face recognition model includes a feature extraction layer and a feature mapping layer. Therefore, in steps 702 and 703, a process of obtaining the prediction feature image corresponding to the sample face image and the prediction feature vector corresponding to the prediction feature image is described by using an example in which the sample face image is processed by using the feature extraction layer and the prediction feature image is processed by using the feature mapping layer. However, in another embodiment, the feature extraction submodel is a submodel in another form, so that the prediction feature image and the prediction feature vector can be obtained by invoking the feature extraction submodel to perform feature extraction on the sample face image.

704. The computer device trains the feature extraction submodel according to a difference between the prediction feature vector and the sample feature vector.

The prediction feature vector is a vector that is predicted by the face recognition model and represents the feature of the sample face image, and the sample feature vector is a real vector that represents the feature of the sample face image. Therefore, when obtaining the prediction feature vector and the sample feature vector, the computer device trains the feature extraction submodel in the face recognition model according to the difference between the prediction feature vector and the sample feature vector, that is, trains the feature extraction layer and the feature mapping layer, so that a difference between the prediction feature vector obtained by the feature extraction layer and the feature mapping layer and the sample feature vector becomes increasingly small.

In one embodiment, the computer device obtains a first loss value between the prediction feature vector and the sample feature vector, and trains the feature extraction submodel according to the first loss value. The first loss value represents the difference between the prediction feature vector and the sample feature vector.

In some embodiments, the computer device obtains a first loss function, and calculates the prediction feature vector and the sample feature vector according to the first loss function, to obtain the first loss value. The first loss function is a function for obtaining loss between the prediction feature vector and the sample feature vector.

In another embodiment, the face recognition model further includes a loss obtaining submodel, and the loss obtaining submodel is connected to the feature extraction submodel. The loss obtaining submodel includes a weight vector corresponding to each face identifier. The computer device performs weighting processing, by invoking the loss obtaining submodel, on the prediction feature vector according to a weight vector corresponding to the face identifier to which the sample face image belongs, to obtain a weighted feature vector corresponding to the prediction feature vector, obtains a second loss value between the weighted feature vector and the sample feature vector, and trains the feature extraction submodel and the loss obtaining submodel according to the second loss value. The second loss value represents a difference between the weighted feature vector and the sample feature vector.

The loss obtaining submodel is configured to obtain a corresponding loss value according to a feature vector. The loss obtaining submodel is connected to the feature extraction submodel. In this embodiment of the present disclosure, the feature extraction submodel includes the feature extraction layer and the feature mapping layer, and the loss obtaining submodel is connected to the feature mapping layer in the feature extraction submodel. In some embodiments, the loss obtaining submodel is a classification network, for example, the classification network is a softmax (logistic regression) network or various softmax networks with margin (difference) types added, or the loss obtaining submodel is in another manner. This is not limited in this embodiment of the present disclosure.

The weight vector corresponding to each face identifier is used for representing a weight of the feature vector corresponding to the face image corresponding to the face identifier. In some embodiments, the prediction feature vector corresponding to the sample face image is a 1×n-dimensional vector, and the prediction feature vector includes feature values of n dimensions. The weight vector corresponding to the face identifier is also a 1×n-dimensional vector, the weight vector includes weight values of n dimensions, and the weight values of n dimensions respectively represent a weight of a feature value of each dimension in a corresponding prediction feature vector.

After obtaining the prediction feature image corresponding to the sample face image, the computer device determines, from a plurality of weight vectors included in the loss obtaining submodel, a weight vector corresponding to the face identifier to which the sample face image belongs, and performs weighting processing, by invoking the loss obtaining submodel, on the prediction feature vector according to the weight vector corresponding to the face identifier to which the sample face image belongs, to obtain the weighted feature vector corresponding to the prediction feature vector. That is, the feature value of each dimension in the prediction feature vector is multiplied with a corresponding weight value in the weight vector to obtain the weighted feature vector. In some embodiments, the loss obtaining submodel further includes a second loss function. The computer device obtains the second loss function, and calculates the weighted feature vector and the sample feature vector according to the second loss function, to obtain the second loss value. The second loss function is a function for obtaining a loss between the weighted feature vector and the sample feature vector.

In another embodiment, the computer device optimizes the feature extraction submodel and the loss obtaining submodel by using a gradient descent method, to train the feature extraction submodel and the loss obtaining submodel. The gradient descent method is a stochastic gradient descent method, a stochastic gradient descent method with a momentum term, an Adagrad method (that is, an adaptive gradient descent method), or the like. This is not limited in this embodiment of the present disclosure.

In steps 701 to 704, it is merely illustrated that the prediction feature vector is obtained according to the sample face image, and the feature extraction submodel and the loss obtaining submodel are trained according to the difference between the prediction feature vector and the sample feature vector, so that the feature extraction submodel is trained according to the sample face image and the sample feature vector corresponding to the sample face image. In another embodiment, the computer device trains the feature extraction submodel according to sample face images and sample feature vectors corresponding to the sample face images by using another manner.

In this embodiment of the present disclosure, an example in which the feature extraction submodel and the loss obtaining submodel are trained according to the sample face image and the sample feature vector corresponding to the sample face image is merely used for description. During actual training, the computer device trains the feature extraction submodel and the loss obtaining submodel according to a plurality of sample face images and sample feature vectors corresponding to the plurality of sample face images. Face identifiers to which any two sample face images in the plurality of sample face images belong are the same, or face identifiers to which any two sample face images belong are different. This is not limited in the present disclosure.

In one embodiment, the computer device obtains a plurality of sample face images and sample feature vectors corresponding to the plurality of sample face images, and inputs the plurality of sample face images into the feature extraction layer in the face recognition model, for the face recognition model to respectively process the plurality of sample face images, to train the feature extraction submodel and the loss obtaining submodel according to the obtained prediction feature vector and corresponding sample feature vectors. The feature extraction submodel and the loss obtaining submodel in the face recognition model can process the plurality of sample face images in parallel. For example, the plurality of sample face images include a first sample face image and a second sample face image. When the loss obtaining submodel in the face recognition model processes the first sample face image, the feature extraction submodel in the face recognition model can process the second sample face image, to implement parallel processing on the plurality of sample face images, thereby improving processing efficiency of the face recognition model.

In another embodiment, the training process of the face recognition model corresponds to a condition for terminating the training of a model, and the condition for terminating the training of a model is that a quantity of iterations of training the model reaches a preset quantity, or a loss of the model is less than a first preset value. This is not limited in this embodiment of the present disclosure. For example, when a quantity of iterations of training the feature extraction submodel and the loss obtaining submodel reaches the preset quantity, the training of the feature extraction submodel and the loss obtaining submodel is completed. Alternatively, when the first loss value or the second loss value obtained by the computer device is less than the first preset value, it indicates that loss values of the feature extraction submodel and the loss obtaining submodel are converged, and the training of the feature extraction submodel and the loss obtaining submodel is completed.

In another embodiment, a trained feature extraction submodel and sample face images used for training the feature extraction submodel are pre-stored in the computer device, the computer device performs the following steps 705 to 707 by obtaining the sample face image used for training the feature extraction submodel without performing steps 701 to 704, and completes the training of the prediction submodel.

705. The computer device obtains center feature vectors corresponding to the sample face images.

Each sample face image corresponds to a face identifier. Each face identifier corresponds to a center feature vector. The center feature vector is used for representing a face feature corresponding to the face identifier, that is, the center feature vector can be used for representing a face feature in the sample face image. After the computer device completes the training of the feature extraction submodel and the loss obtaining submodel in the face recognition model, the computer device obtains a center feature vector of the face identifier to which the sample face image belongs.

In one embodiment, the computer device obtains feature vectors corresponding to a plurality of face images of the face identifiers to which the sample face images belong, and determines a center feature vector according to the plurality of obtained feature vectors. During the training of the feature extraction submodel and the loss obtaining submodel, the computer device obtains the feature vectors corresponding to the plurality of face images, the computer device determines a plurality of face images of face identifiers to which the sample face images belong, obtains the plurality of feature vectors corresponding to the plurality of face images, and performs a mean value operation on the plurality of obtained feature vectors, to obtain center feature vectors corresponding to the face identifiers to which the sample face images belong.

In another embodiment, the computer device obtains a weight vector corresponding to the face identifier to which the sample face image belongs, and determines the weight vector corresponding to the sample face image as the center feature vector.

The loss obtaining submodel includes a weight vector corresponding to each face identifier. During the training of the feature extraction submodel and the loss obtaining submodel, each weight vector in the loss obtaining submodel is continuously adjusted. When the training is completed, the loss obtaining submodel includes each trained weight vector. The computer device can determine the face identifier to which the sample face image belongs, obtain a weight vector corresponding to the face identifier from the plurality of weight vectors in the loss obtaining submodel, and determine the weight vector as the center feature vector corresponding to the face identifier to which the sample face image belongs.

706. The computer device processes the prediction feature image by invoking the prediction submodel, to obtain a prediction feature value corresponding to the prediction feature image.

The prediction feature value refers to a degree of difference between the face feature included in the prediction feature image and the face feature in the sample face image, that is, the prediction feature value is used for representing uncertainty of the face feature of the sample face image described by the prediction feature image. An implementation process and related content in step 706 are similar to that in step 403. Details are not described herein.

In this embodiment of the present disclosure, an example in which step 705 is performed before step 706 is merely used for description. In another embodiment, step 706 is performed before step 705.

707. The computer device obtains a third loss value according to the prediction feature vector, the center feature vector, and the prediction feature value, and trains the prediction submodel according to the third loss value.

When obtaining the prediction feature vector, the center feature vector, and the prediction feature value that correspond to the sample face image, the computer device obtains the third loss value according to the prediction feature vector, the center feature vector, and the prediction feature value, and trains the prediction submodel in the face recognition model according to the third loss value, so that the prediction feature value corresponding to the prediction feature image outputted by the prediction submodel is more accurate. The third loss value represents a loss of the prediction feature value corresponding to the prediction feature image.

In one embodiment, the computer device obtains a third loss function, and calculates the prediction feature vector, the center feature vector, and the prediction feature value according to the third loss function, to obtain the third loss value. The third loss function is a function for obtaining the loss of the prediction feature value. In some embodiments, a formula of the third loss function is as follows:

$$L_s = -\frac{k}{r}\mu^T w_{x \in c} - \left(\frac{d}{2} - 1\right)\log k + \log\left(I_{\frac{d}{2}-1}(k)\right) + \frac{d}{2}\log 2\pi r^2;$$

where $L_s$ represents the third loss value, k represents the prediction feature value, r represents a radius in a hyperspherical space to which a feature of the face image is mapped, $\mu$ represents the prediction feature vector, $\mu^T$ represents a transpose of the prediction feature vector, $w_{x \in c}$ represents the center feature vector corresponding to the sample face image, x represents a current sample face image, c represents at least one face image corresponding to the face identifier to which the sample face image belongs, d represents a dimension of a feature vector outputted by the feature mapping layer, and $$I_{\frac{d}{2}-1}(k)$$

is a Bessel function.

In another embodiment, the computer device obtains a target feature value according to a distance between the prediction feature vector and the center feature vector, and obtains the third loss value according to a difference between the target feature value and the prediction feature value.

The prediction feature value is used for representing uncertainty of the face feature in the face image described by the sample face image. However, in an actual application scenario, the computer device can obtain a similarity between the face images according to a feature vector and a feature value corresponding to a feature image. Therefore, the prediction feature value actually represents uncertainty that the prediction feature vector corresponding to the sample face image matches the center feature vector corresponding to the sample face image. A smaller distance between the prediction feature vector and the center feature vector indicates that the prediction feature vector and the center feature vector are more similar, that is, the prediction feature vector and the center feature vector better match each other.

The computer device can obtain the target feature value according to the distance between the prediction feature vector and the center feature vector, and the target feature value can represent the uncertainty that the prediction feature vector matches the center feature vector. A larger distance between the prediction feature vector and the center feature vector indicates that the uncertainty that the prediction feature vector matches the center feature vector is greater, that is, the target feature value is greater. A smaller distance between the prediction feature vector and the center feature vector indicates that the uncertainty that the prediction feature vector matches the center feature vector is smaller, that is, the target feature value is smaller.

However, in an actual application scenario, a face identifier to which a to-be-recognized face image belongs cannot be known. Therefore, a center feature vector corresponding to the face image cannot be known, and the computer device obtains a feature value according to a feature image. Therefore, during the training of the prediction submodel, it is necessary to ensure that the prediction feature value obtained by the prediction submodel can represent uncertainty of matching the prediction feature vector corresponding to the sample face image with the center feature vector corresponding to the sample face image, that is, it is necessary to ensure that the difference between the prediction feature value and the target feature value is small. Therefore, in some embodiments, the computer device obtains the third loss value according to the difference between the prediction feature value and the target feature value, and trains the prediction submodel according to the third loss value, so that the difference between the prediction feature value and the target feature value becomes increasingly small, and the prediction feature value outputted by the prediction submodel becomes increasingly accurate.

In another embodiment, the computer device optimizes the prediction submodel by using a gradient descent method, to train the prediction submodel. The gradient descent method is a stochastic gradient descent method, a stochastic gradient descent method with a momentum term, an Adagrad method (that is, an adaptive gradient descent method), or the like. This is not limited in this embodiment of the present disclosure. For an optimization gradient of a feature value, reference is made to the following formula:

$$\nabla_k L(\mu, k) = -\frac{1}{r}\mu^T W_{x \in c} - \left(\frac{d}{2} - 1\right)\frac{1}{k} + \frac{1}{2}\left[I_{\frac{d}{2}-1}(k) + I_{\frac{d}{2}}(k)\right],$$

where r represents a radius in a hyperspherical space to which a feature of the face image is mapped, $\mu$ represents the prediction feature vector corresponding to the sample face image, $\mu^T$ represents a transpose of the prediction feature vector, $W_{x \in c}$ represents the center feature vector corresponding to the sample face image, x represents a current sample face image, c represents at least one face image corresponding to the face identifier to which the sample face image belongs, d represents a dimension of a feature vector outputted by the feature mapping layer, and $$I_{\frac{d}{2}-2}(k) \text{ and } I_{\frac{d}{2}}(k)$$

are Bessel functions.

By performing steps 705 to 707, in case of keeping the trained feature extraction submodel unchanged, the prediction submodel is trained according to the sample feature vector and the center feature vector of the face identifier to which the sample face image belongs. In another embodiment, the computer device trains the prediction submodel according to the sample feature vector and the center feature vector.

In some other embodiments, another space distribution with a closed-form solution is used in this embodiment of the present disclosure to model the feature distribution of the hyperspherical space, so as to reduce the training process of the face recognition model.

Figure 8:
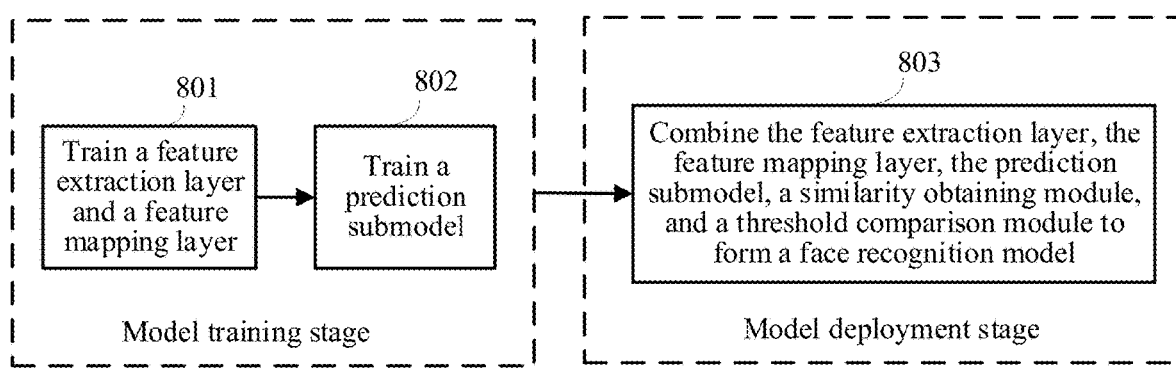
FIG. 8 is a flowchart of training a model and deploying a model according to an embodiment of the present disclosure.

In the method provided in this embodiment of the present disclosure, the training process of the face recognition model is divided into a training stage of the feature extraction submodel and a training stage of the prediction submodel. In one embodiment, a function of obtaining a similarity is encapsulated as a similarity obtaining module, and a function of comparing the similarity with a preset threshold is encapsulated as a threshold comparison module. In some embodiments, the computer device deploys the trained feature extraction submodel, prediction submodel, the similarity obtaining module, and the threshold comparison module to obtain a face recognition model. FIG. 8 is a flowchart of training a model and deploying a model according to an embodiment of the present disclosure. Referring to FIG. 8, the following steps are included: 801. Train a feature extraction layer and a feature mapping layer. 802. Train a prediction submodel. 803. Combine the feature extraction layer, the feature mapping layer, the prediction submodel, a similarity obtaining module, and a threshold comparison module to form a face recognition model.

Figure 9:
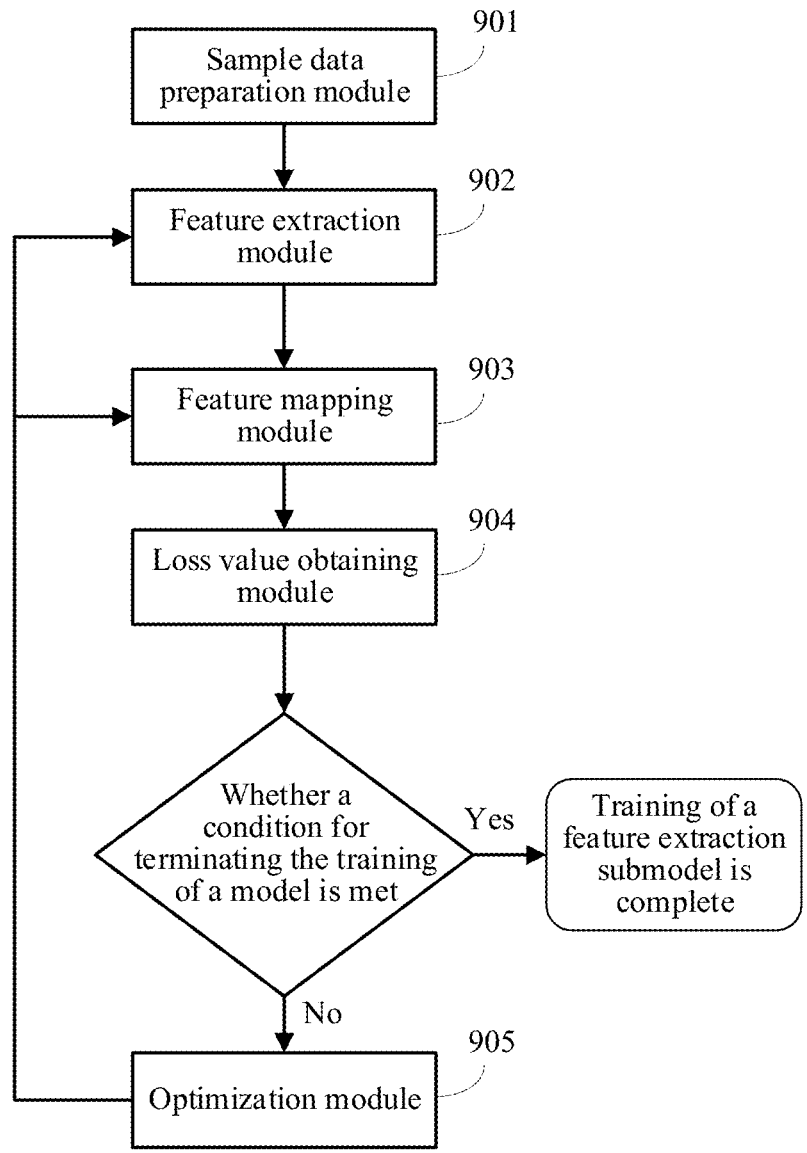
FIG. 9 is a flowchart of training a feature extraction submodel according to an embodiment of the present disclosure.

FIG. 9 is a flowchart of training a feature extraction submodel according to an embodiment of the present disclosure. In FIG. 9, steps of training the feature extraction submodel are divided into a plurality of modules for description. Referring to FIG. 9, a sample data preparation module 901 is configured to obtain sample face images and sample feature vectors corresponding to the sample face images; a feature extraction module 902 is configured to process sample face images by invoking a feature extraction layer, to obtain a prediction feature image; a feature mapping module 903 is configured to process the prediction feature image by invoking a feature mapping layer, to obtain a prediction feature vector; and a loss value obtaining module 904 is configured to process the prediction feature vector and the sample feature vector, to obtain a loss value. When the loss value is obtained, it is determined whether a condition for terminating the training of a model is currently met. If so, the training of the feature extraction submodel is completed; otherwise, parameters of the feature extraction layer in the feature extraction module 902 and parameters of the feature mapping layer in the feature mapping module 903 are optimized by an optimization module 905. The condition for terminating the training of a model is that a quantity of iterations of training a model reaches a preset quantity, or a loss value is less than a preset value.

Figure 10:
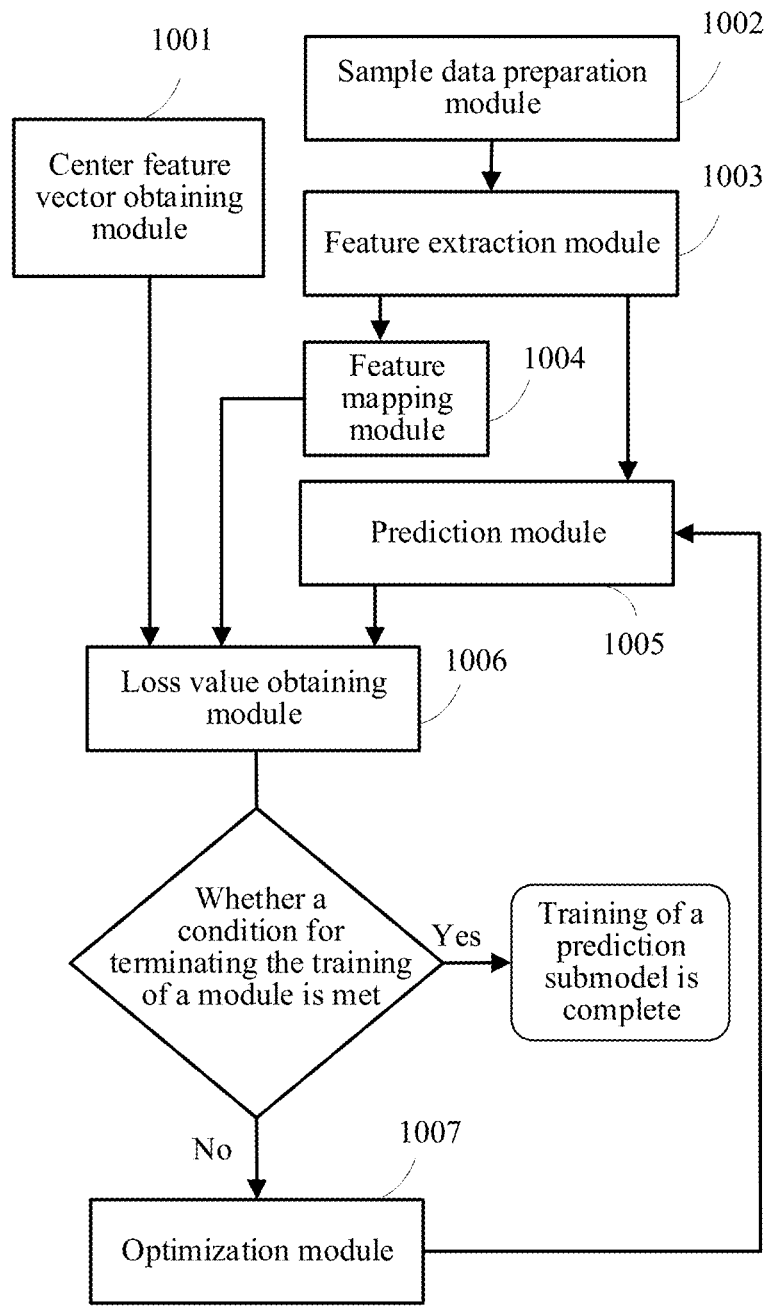
FIG. 10 is a flowchart of training a prediction submodel according to an embodiment of the present disclosure.

FIG. 10 is a flowchart of training a prediction submodel according to an embodiment of the present disclosure. In FIG. 10, steps of training the prediction submodel are divided into a plurality of modules for description. Referring to FIG. 10, a center feature vector obtaining module 1001 is configured to obtain a center feature vector corresponding to a face identifier to which sample face images belongs, a sample data preparation module 1002 is configured to obtain the sample face image, a feature extraction module 1003 is configured to process the sample face image by invoking a feature extraction layer, to obtain a prediction feature image, a feature mapping module 1004 is configured to process the prediction feature image by invoking a feature mapping layer, to obtain a prediction feature vector, a prediction module 1005 is configured to process the prediction feature image by invoking the prediction submodel, to obtain a prediction feature value, and a loss value obtaining module 1006 is configured to obtain a loss value corresponding to the prediction feature value according to the center feature vector, the prediction feature vector, and the prediction feature value. When the loss value is obtained, it is determined whether a condition for terminating the training of a model is currently met. If so, the training of the prediction submodel is completed; otherwise, parameters of the prediction submodel in the prediction module 1005 are optimized by an optimization module 1007. The condition for terminating the training of a model is that a quantity of iterations of training a model reaches a preset quantity, or a loss value is less than a preset value.

In the method provided in this embodiment of the present disclosure, sample face images and sample feature vectors corresponding to the sample face images are obtained, a prediction feature image and a prediction feature vector of the sample face image are extracted by invoking a feature extraction submodel, and the feature extraction submodel is trained according to a difference between the prediction feature vector and the sample feature vector. A center feature vector of a face identifier to which the sample face image belongs is obtained, a prediction feature value corresponding to the prediction feature image is obtained by invoking a prediction submodel, and a third loss value is obtained according to the prediction feature vector, the center feature vector, and the prediction feature value, and the prediction submodel is trained according to the third loss value. Subsequently, face recognition can be performed by a face recognition model including a feature extraction submodel and a prediction submodel. Because the prediction submodel is introduced, when the similarity between the target face image and the template face image is obtained, the influence of a feature value outputted by the prediction submodel on the similarity is also considered, that is, the influence of the uncertainty of the feature image on the similarity is considered, rather than only considering the feature vector corresponding to the feature image, which can effectively reduce the situation that the feature vector cannot accurately represent a feature of a face due to interference factors in the face image, can improve the accuracy of face recognition, and reduce a misjudgment rate of face recognition.

In addition, the feature extraction submodel is trained according to the sample face image and the sample feature vector corresponding to the sample face image. In a case of keeping the trained feature extraction submodel unchanged, the prediction submodel is trained according to the sample feature vector and the center feature vector of the face identifier to which the sample face image belongs. Therefore, in some embodiments, a training process of the face recognition model is divided into a training stage of the feature extraction submodel and a training stage of the prediction submodel. When the feature extraction submodel is trained, the prediction submodel is trained by obtaining the sample face image for training the feature extraction submodel and without retraining a new feature extraction submodel or re-acquiring sample face images.

In addition, in this embodiment of the present disclosure, the feature of the sample face image is mapped to a hyperspherical space, to obtain the prediction feature image corresponding to the sample face image. Compared with a two-dimensional Euclidean space, the hyperspherical space is more conformable to a feature space of a face. Therefore, performing feature extraction on the face in the hyperspherical space can make an extracted face feature more accurate, and can improve the accuracy of the trained face recognition model for face recognition.

Figure 11:
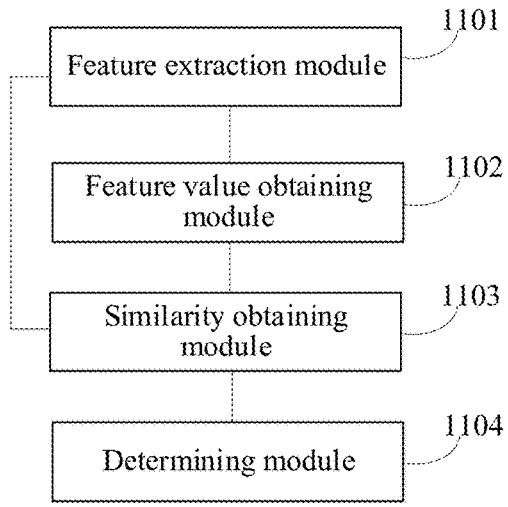
FIG. 11 is a schematic structural diagram of a face recognition apparatus according to an embodiment of the present disclosure.

FIG. 11 is a schematic structural diagram of a face recognition apparatus according to an embodiment of the present disclosure. Referring to FIG. 11, the apparatus includes:

a feature extraction module 1101, configured to perform feature extraction on a target face image, to obtain a first feature image corresponding to the target face image and a first feature vector corresponding to the first feature image, the first feature image representing a face feature of the target face image;

a feature value obtaining module 1102, configured to process the first feature image, to obtain a first feature value corresponding to the first feature image, the first feature value representing a degree of difference between a face feature included in the first feature image and a face feature of the target face image;

a similarity obtaining module 1103, configured to obtain a similarity between the target face image and a template face image according to the first feature vector, the first feature value, a second feature vector, and a second feature value, the second feature vector being a feature vector corresponding to a second feature image of the template face image, the second feature value being a feature value corresponding to the second feature image, the second feature value representing uncertainty corresponding to the second feature image, and the uncertainty corresponding to the second feature image being a degree of difference between a face feature included in the second feature image and a face feature of the template face image; and a determining module 1104, configured to determine, when the similarity is greater than a preset threshold, that the target face image matches the template face image.

The apparatus provided in this embodiment of the present disclosure includes: obtaining a first feature image corresponding to a target face image and a first feature vector and a first feature value corresponding to the first feature image, obtaining a similarity between the target face image and a template face image according to the first feature vector, the first feature value, and a second feature vector and a second feature value corresponding to a second feature image of the template face image, and determining, when the similarity is greater than a preset threshold, that the target face image matches the template face image. The first feature value represents uncertainty corresponding to the first feature image, the second feature value represents uncertainty corresponding to the second feature image, and the uncertainty can represent a degree of difference between a feature image and a face image. Therefore, when the similarity between the target face image and the template face image is obtained, the influence of the uncertainty of the feature image on the similarity is also considered, rather than only considering a feature vector corresponding to the feature image, which can effectively reduce the situation that the feature vector cannot accurately represent a feature of a face due to interference factors in the face image, can improve the accuracy of face recognition, and reduce a misjudgment rate of face recognition.

Figure 12:
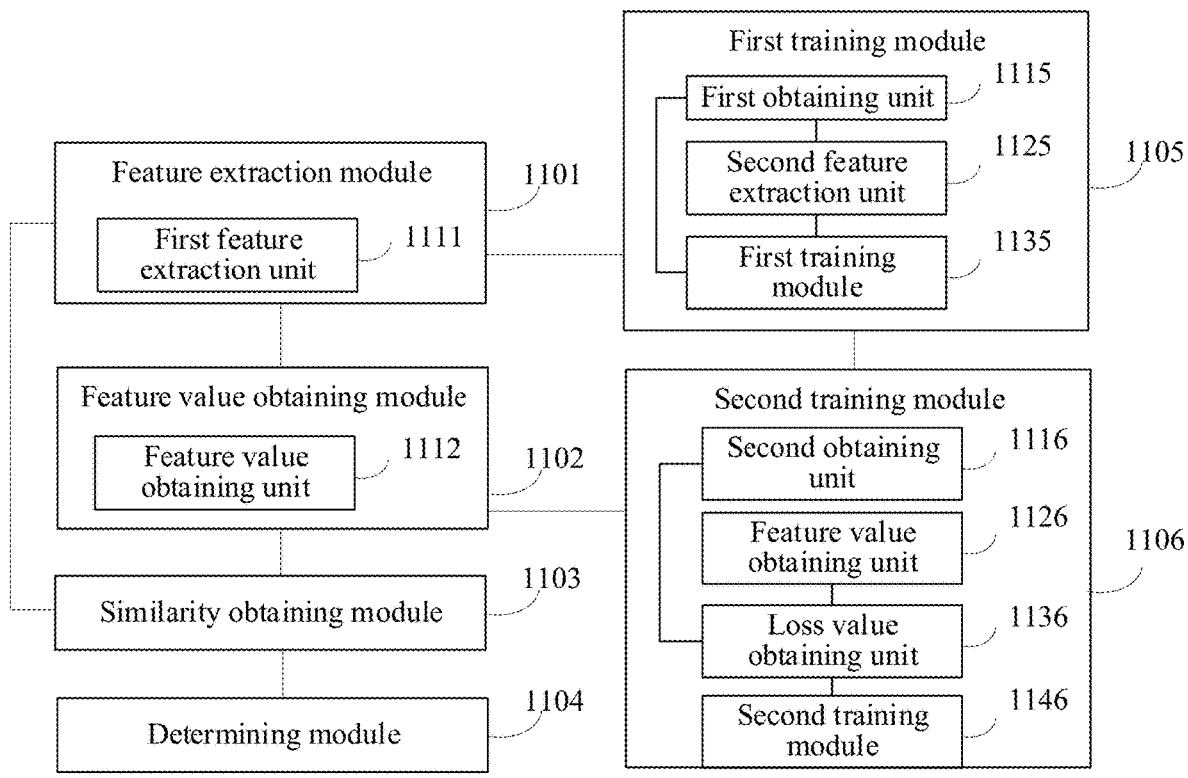
FIG. 12 is a schematic structural diagram of another face recognition apparatus according to an embodiment of the present disclosure.

In some embodiments, referring to FIG. 12, the feature extraction module 1101 includes a first feature extraction unit 1111, configured to perform feature extraction on the target face image by invoking a feature extraction submodel in a face recognition model, to obtain the first feature image corresponding to the target face image and the first feature vector corresponding to the first feature image.

In some embodiments, referring to FIG. 12, the feature value obtaining module 1102 includes a feature value obtaining unit 1112, configured to process the first feature image by invoking a prediction submodel in the face recognition model, to obtain a first feature value corresponding to the first feature image.

In some embodiments, referring to FIG. 12, the feature extraction submodel includes a feature extraction layer and a feature mapping layer, and the first feature extraction unit 1111 is configured to perform feature extraction on the target face image by invoking the feature extraction layer, to obtain the first feature image corresponding to the target face image; and perform feature mapping on the first feature image by invoking the feature mapping layer, to obtain the first feature vector corresponding to the first feature image.

In some embodiments, referring to FIG. 12, the apparatus further includes a first training module 1105, configured to train the feature extraction submodel according to sample face images and sample feature vectors corresponding to the sample face images; and a second training module 1106, configured to train the prediction submodel according to the sample feature vector and center feature vectors corresponding to the sample face images in case of keeping the trained feature extraction submodel unchanged, the center feature vector representing a face feature corresponding to a face identifier to which the sample face image belongs.

In some embodiments, referring to FIG. 12, the first training module 1105 includes a first obtaining unit 1115, configured to obtain the sample face image and the sample feature vector corresponding to the sample face image; a second feature extraction unit 1125, configured to perform feature extraction on the sample face image by invoking the feature extraction submodel, to obtain a prediction feature image corresponding to the sample face image and a prediction feature vector corresponding to the prediction feature image; and a first training unit 1135, configured to train the feature extraction submodel according to a difference between the prediction feature vector and the sample feature vector.

In some embodiments, referring to FIG. 12, the feature extraction submodel includes a feature extraction layer and a feature mapping layer, and the second feature extraction unit 1125 is further configured to perform feature extraction on the sample face image by invoking the feature extraction layer, to obtain the prediction feature image corresponding to the sample face image; and perform feature mapping on the prediction feature image by invoking the feature mapping layer, to obtain the prediction feature vector corresponding to the prediction feature image.

In some embodiments, referring to FIG. 12, the first training unit 1135 is further configured to obtain a first loss value between the prediction feature vector and the sample feature vector, the first loss value representing the difference between the prediction feature vector and the sample feature vector; and train the feature extraction submodel according to the first loss value.

In some embodiments, referring to FIG. 12, the face recognition model further includes a loss obtaining submodel, the loss obtaining submodel includes a weight vector corresponding to each face identifier, and the first training unit 1135 is further configured to perform weighting processing, by invoking the loss obtaining submodel, on the prediction feature vector according to the weight vector corresponding to the face identifier to which the sample face image belongs, to obtain a weighted feature vector corresponding to the prediction feature vector; obtain a second loss value between the weighted feature vector and the sample feature vector, the second loss value representing a difference between the weighted feature vector and the sample feature vector; and train the feature extraction submodel and the loss obtaining submodel according to the second loss value.

In some embodiments, referring to FIG. 12, the second training module 1106 includes a second obtaining unit 1116, configured to obtain the center feature vector corresponding to the sample face image, the center feature vector representing a face feature corresponding to the face identifier; a feature value obtaining unit 1126, configured to process the prediction feature image by invoking the prediction submodel, to obtain a prediction feature value corresponding to the prediction feature image, the prediction feature value representing uncertainty corresponding to the prediction feature image, the uncertainty corresponding to the prediction feature image being a degree of difference between a face feature included in the prediction feature image and a face feature of the sample face image; a loss value obtaining unit 1136, configured to obtain a third loss value according to the prediction feature vector, the center feature vector, and the prediction feature value, the third loss value representing a loss of the prediction feature value corresponding to the prediction feature image; and a second training unit 1146, configured to train the prediction submodel according to the third loss value.

In some embodiments, referring to FIG. 12, the loss value obtaining unit 1136 is further configured to obtain a target feature value according to a distance between the prediction feature vector and the center feature vector; and obtain the third loss value according to a difference between the target feature value and the prediction feature value.

In some embodiments, referring to FIG. 12, the second obtaining unit 1116 is further configured to obtain feature vectors corresponding to a plurality of face images, the plurality of face images being face images corresponding to the face identifiers to which the sample face images belong; and determine the center feature vector according to the plurality of obtained feature vectors.

In some embodiments, referring to FIG. 12, the second obtaining unit 1116 is further configured to obtain the weight vector corresponding to the face identifier to which the sample face image belongs; and determine the weight vector corresponding to the sample face image as the center feature vector.

In some embodiments, referring to FIG. 12, the feature extraction module 1101 is further configured to perform feature extraction on the template face image, to obtain a second feature image corresponding to the template face image and a second feature vector corresponding to the second feature image; and the feature value obtaining module 1102 is further configured to process the second feature image, to obtain a second feature value corresponding to the second feature image.

In some embodiments, referring to FIG. 12, the first feature extraction unit 1111 is further configured to perform feature extraction on the template face image by invoking the feature extraction submodel in the face recognition model, to obtain the second feature image corresponding to the template face image and the second feature vector corresponding to the second feature image.

In some embodiments, referring to FIG. 12, the feature value obtaining unit 1112 is further configured to process the second feature image by invoking the prediction submodel in the face recognition model, to obtain the second feature value corresponding to the second feature image.

In some embodiments, referring to FIG. 12, the feature extraction submodel includes the feature extraction layer and the feature mapping layer, and the first feature extraction unit 1111 is further configured to perform feature extraction on the template face image by invoking the feature extraction layer, to obtain the second feature image corresponding to the template face image; and perform feature mapping on the second feature image by invoking the feature mapping layer, to obtain the second feature vector corresponding to the second feature image.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The division of the foregoing functional modules is merely described for exemplary purposes when the face recognition apparatus provided in the foregoing embodiments performs face recognition. In some embodiments of actual applications, the functions are allocated to different functional modules according to specific requirements. That is, the internal structure of the computer device is divided into different functional modules to complete all or some of the foregoing described functions. In addition, the face recognition apparatus and the face recognition method embodiments provided in the foregoing embodiments belong to the same concept. For the specific implementation process, reference may be made to the method embodiments, and details are not described herein again.

Figure 13:
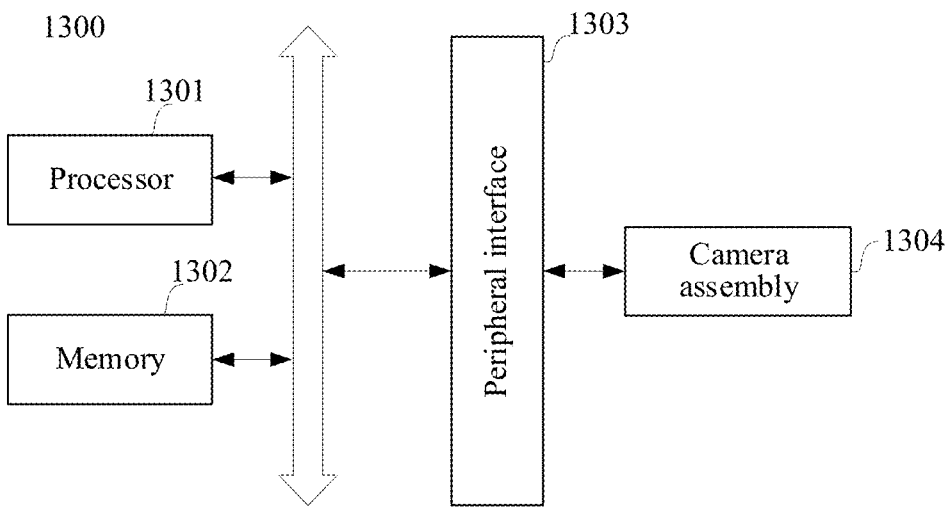
FIG. 13 is a schematic structural diagram of a terminal according to an embodiment of the present disclosure.

FIG. 13 is a schematic structural diagram of a terminal 1300 according to an exemplary embodiment of the present disclosure. The terminal 1300 can be configured to perform the steps performed by the computer device in the face recognition method provided in the foregoing embodiments.

Generally, the terminal 1300 includes a processor 1301 and a memory 1302.

The processor 1301 includes one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 includes a main processor and a coprocessor. The main processor is configured to process data in an active state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display screen. In some embodiments, the processor 1301 further includes an AI processor. The AI processor is configured to process computing operations related to machine learning.

The memory 1302 includes one or more computer-readable storage media. The computer-readable storage medium is non-transient. The memory 1302 further includes a high-speed random access memory and a non-volatile memory, such as one or more magnetic disk storage devices or flash storage devices. In some embodiments, the non-transitory computer-readable storage medium in the memory 1302 is configured to store at least one instruction, and the at least one instruction being configured to be executed by the processor 1301 to implement the method steps performed by the computer device in the foregoing face recognition method.

In some embodiments, the terminal 1300 may further include: a peripheral interface 1303 and at least one peripheral. The processor 1301, the memory 1302, and the peripheral interface 1303 may be connected through a bus or a signal cable. Each peripheral is connected to the peripheral interface 1303 through a bus, a signal cable, or a circuit board. Specifically, the peripheral interface includes a camera assembly 1304.

The camera assembly 1304 is configured to capture an image or a video. In some embodiments, the camera assembly 1304 includes a front-facing camera and a rear-facing camera. Generally, the front-facing camera is disposed on a front panel of the terminal 1300, and the rear-facing camera is disposed on a rear surface of the terminal 1300. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 1304 further includes a flash. The flash is a single color temperature flash or a double color temperature flash. The double color temperature flash is a combination of a warm light flash and a cold light flash, and may be used for light compensation under different color temperatures.

A person skilled in the art can understand that the structure shown in FIG. 13 does not constitute a limitation to the terminal 1300. In some embodiments, the terminal 1300 includes more components or fewer components than those shown in the figure, or some components may be combined, or a different component deployment may be used.

Figure 14:
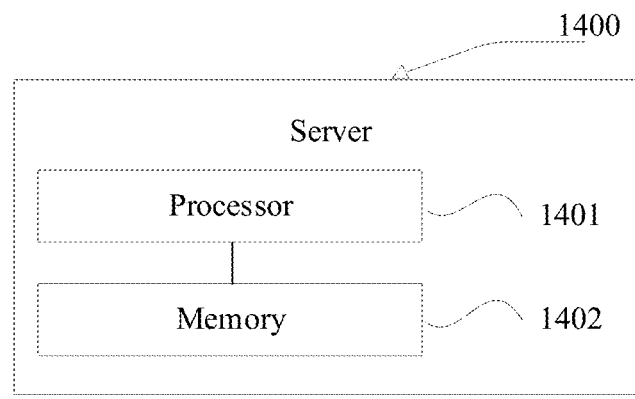
FIG. 14 is a schematic structural diagram of a server according to an embodiment of the present disclosure.

FIG. 14 is a schematic structural diagram of a server according to an embodiment of the present disclosure. In some embodiments, the server 1400 varies a lot due to different configurations or performance, and includes one or more processors (CPUs) 1401 and one or more memories 1402. The memory 1402 stores at least one instruction, the at least one instruction being loaded and executed by the processor 1401 to implement the method provided in the foregoing method embodiments. Certainly, the server also has a wired or wireless network interface, a keyboard, an input/output interface and other components to facilitate input/output. The server also includes other components for implementing device functions. Details are not described herein again.

The server 1400 can be configured to perform the steps performed by the computer device in the face recognition method provided in the foregoing embodiments.

An embodiment of the present disclosure further provides a computer device for face recognition. The computer device includes a processor and a memory, the memory storing at least one instruction, the instruction being loaded and executed by the processor to implement the method steps of the following face recognition method:

performing feature extraction on a target face image, to obtain a first feature image corresponding to the target face image and a first feature vector corresponding to the first feature image, the first feature image representing a face feature of the target face image;

processing the first feature image, to obtain a first feature value corresponding to the first feature image, the first feature value representing a degree of difference between a face feature included in the first feature image and a face feature of the target face image;

obtaining a similarity between the target face image and a template face image according to the first feature vector, the first feature value, a second feature vector, and a second feature value, the second feature vector being a feature vector corresponding to a second feature image of the template face image, the second feature image representing a face feature of the template face image, the second feature value being a feature value corresponding to the second feature image, the second feature value representing uncertainty corresponding to the second feature image, and the uncertainty corresponding to the second feature image being a degree of difference between a face feature included in the second feature image and a face feature of the template face image; and determining, when the similarity is greater than a preset threshold, that the target face image matches the template face image.

In one embodiment, the performing feature extraction on a target face image, to obtain a first feature image corresponding to the target face image and a first feature vector corresponding to the first feature image includes:

performing feature extraction on the target face image by invoking a feature extraction submodel in a face recognition model, to obtain the first feature image corresponding to the target face image and the first feature vector corresponding to the first feature image.

In one embodiment, the processing the first feature image, to obtain a first feature value corresponding to the first feature image includes:

processing the first feature image by invoking a prediction submodel in the face recognition model, to obtain the first feature value corresponding to the first feature image.

In one embodiment, the feature extraction submodel includes a feature extraction layer and a feature mapping layer, and the performing feature extraction on the target face image by invoking a feature extraction submodel in a face recognition model, to obtain the first feature image corresponding to the target face image and the first feature vector corresponding to the first feature image includes:

performing feature extraction on the target face image by invoking the feature extraction layer, to obtain the first feature image corresponding to the target face image; and performing feature mapping on the first feature image by invoking the feature mapping layer, to obtain the first feature vector corresponding to the first feature image.

In one embodiment, before the processing the first feature image by invoking a prediction submodel in the face recognition model, to obtain the first feature value corresponding to the first feature image, the method further includes:

training the feature extraction submodel according to sample face images and sample feature vectors corresponding to the sample face images; and training the prediction submodel according to the sample feature vector and center feature vectors corresponding to the sample face images in case of keeping the trained feature extraction submodel unchanged, the center feature vector representing a face feature corresponding to a face identifier to which the sample face image belongs.

In one embodiment, the training the feature extraction submodel according to sample face images and sample feature vectors corresponding to the sample face images includes:

obtaining the sample face image and the sample feature vector corresponding to the sample face image;

performing feature extraction on the sample face image by invoking the feature extraction submodel, to obtain a prediction feature image corresponding to the sample face image and a prediction feature vector corresponding to the prediction feature image; and training the feature extraction submodel according to a difference between the prediction feature vector and the sample feature vector.

In one embodiment, the feature extraction submodel includes the feature extraction layer and the feature mapping layer, and the performing feature extraction on the sample face image by invoking the feature extraction submodel, to obtain a prediction feature image corresponding to the sample face image and a prediction feature vector corresponding to the prediction feature image includes:

performing feature extraction on the sample face image by invoking the feature extraction layer, to obtain the prediction feature image corresponding to the sample face image; and performing feature mapping on the prediction feature image by invoking the feature mapping layer, to obtain the prediction feature vector corresponding to the prediction feature image.

In one embodiment, the training the feature extraction submodel according to a difference between the prediction feature vector and the sample feature vector includes:

obtaining a first loss value between the prediction feature vector and the sample feature vector, the first loss value representing the difference between the prediction feature vector and the sample feature vector; and training the feature extraction submodel according to the first loss value.

In one embodiment, the face recognition model further includes a loss obtaining submodel, the loss obtaining submodel includes a weight vector corresponding to each face identifier, and the training the feature extraction submodel according to a difference between the prediction feature vector and the sample feature vector includes:

performing weighting processing, by invoking the loss obtaining submodel, on the prediction feature vector according to a weight vector corresponding to the face identifier to which the sample face image belongs, to obtain a weighted feature vector corresponding to the prediction feature vector;

obtaining a second loss value between the weighted feature vector and the sample feature vector, the second loss value representing a difference between the weighted feature vector and the sample feature vector; and training the feature extraction submodel and the loss obtaining submodel according to the second loss value.

In one embodiment, the training the prediction submodel according to the sample feature vector and center feature vectors corresponding to the sample face images in case of keeping the trained feature extraction submodel unchanged includes:

obtaining the center feature vector corresponding to the sample face image;

processing the prediction feature image by invoking the prediction submodel, to obtain a prediction feature value corresponding to the prediction feature image, the prediction feature value representing uncertainty corresponding to the prediction feature image, the uncertainty corresponding to the prediction feature image being a degree of difference between a face feature included in the prediction feature image and a face feature of the sample face image;

obtaining a third loss value according to the prediction feature vector, the center feature vector, and the prediction feature value, the third loss value representing a loss of the prediction feature value corresponding to the prediction feature image; and training the prediction submodel according to the third loss value.

In one embodiment, the obtaining a third loss value according to the prediction feature vector, the center feature vector, and the prediction feature value includes:

obtaining a target feature value according to a distance between the prediction feature vector and the center feature vector; and obtaining the third loss value according to a difference between the target feature value and the prediction feature value.

In one embodiment, the obtaining the center feature vector corresponding to the sample face image includes:

obtaining feature vectors corresponding to a plurality of face images, the plurality of face images being face images corresponding to the face identifiers to which the sample face images belong; and determining the center feature vector according to the plurality of obtained feature vectors.

In one embodiment, the obtaining the center feature vector corresponding to the sample face image includes:

obtaining the weight vector corresponding to the face identifier to which the sample face image belongs; and determining the weight vector corresponding to the sample face image as the center feature vector.

In one embodiment, before the obtaining a similarity between the target face image and a template face image according to the first feature vector, the first feature value, a second feature vector, and a second feature value, the method further includes:

performing feature extraction on the template face image, to obtain the second feature image corresponding to the template face image and the second feature vector corresponding to the second feature image; and processing the second feature image, to obtain the second feature value corresponding to the second feature image.

In one embodiment, the performing feature extraction on the template face image, to obtain the second feature image corresponding to the template face image and the second feature vector corresponding to the second feature image includes:

performing feature extraction on the template face image by invoking the feature extraction submodel in the face recognition model, to obtain the second feature image corresponding to the template face image and the second feature vector corresponding to the second feature image.

In one embodiment, the processing the second feature image, to obtain the second feature value corresponding to the second feature image includes:

processing the second feature image by invoking the prediction submodel in the face recognition model, to obtain the second feature value corresponding to the second feature image.

In one embodiment, the feature extraction submodel includes the feature extraction layer and the feature mapping layer, and the performing feature extraction on the template face image by invoking the feature extraction submodel in the face recognition model, to obtain the second feature image corresponding to the template face image and the second feature vector corresponding to the second feature image includes:

performing feature extraction on the template face image by invoking the feature extraction layer, to obtain the second feature image corresponding to the template face image; and performing feature mapping on the second feature image by invoking the feature mapping layer, to obtain the second feature vector corresponding to the second feature image.

An embodiment of the present disclosure further provides a computer-readable storage medium, storing at least one instruction, the at least one instruction being loaded and executed by a processor to implement the method steps of the following face recognition method:

performing feature extraction on a target face image, to obtain a first feature image corresponding to the target face image and a first feature vector corresponding to the first feature image, the first feature image representing a face feature of the target face image;

processing the first feature image, to obtain a first feature value corresponding to the first feature image, the first feature value representing a degree of difference between a face feature included in the first feature image and a face feature of the target face image;

obtaining a similarity between the target face image and a template face image according to the first feature vector, the first feature value, a second feature vector, and a second feature value, the second feature vector being a feature vector corresponding to a second feature image of the template face image, the second feature image representing a face feature of the template face image, the second feature value being a feature value corresponding to the second feature image, the second feature value representing uncertainty corresponding to the second feature image, and the uncertainty corresponding to the second feature image being a degree of difference between a face feature included in the second feature image and a face feature of the template face image; and determining, when the similarity is greater than a preset threshold, that the target face image matches the template face image.

In one embodiment, the performing feature extraction on a target face image, to obtain a first feature image corresponding to the target face image and a first feature vector corresponding to the first feature image includes:

performing feature extraction on the target face image by invoking a feature extraction submodel in a face recognition model, to obtain the first feature image corresponding to the target face image and the first feature vector corresponding to the first feature image.

In one embodiment, the processing the first feature image, to obtain a first feature value corresponding to the first feature image includes:

processing the first feature image by invoking a prediction submodel in the face recognition model, to obtain the first feature value corresponding to the first feature image.

In one embodiment, the feature extraction submodel includes a feature extraction layer and a feature mapping layer, and the performing feature extraction on the target face image by invoking a feature extraction submodel in a face recognition model, to obtain the first feature image corresponding to the target face image and the first feature vector corresponding to the first feature image includes:

performing feature extraction on the target face image by invoking the feature extraction layer, to obtain the first feature image corresponding to the target face image; and performing feature mapping on the first feature image by invoking the feature mapping layer, to obtain the first feature vector corresponding to the first feature image.

In one embodiment, before the processing the first feature image by invoking a prediction submodel in the face recognition model, to obtain the first feature value corresponding to the first feature image, the method further includes:

training the feature extraction submodel according to sample face images and sample feature vectors corresponding to the sample face images; and training the prediction submodel according to the sample feature vector and center feature vectors corresponding to the sample face images in case of keeping the trained feature extraction submodel unchanged, the center feature vector representing a face feature corresponding to a face identifier to which the sample face image belongs.

In one embodiment, the training the feature extraction submodel according to sample face images and sample feature vectors corresponding to the sample face images includes:

obtaining the sample face image and the sample feature vector corresponding to the sample face image;

performing feature extraction on the sample face image by invoking the feature extraction submodel, to obtain a prediction feature image corresponding to the sample face image and a prediction feature vector corresponding to the prediction feature image; and training the feature extraction submodel according to a difference between the prediction feature vector and the sample feature vector.

In one embodiment, the feature extraction submodel includes the feature extraction layer and the feature mapping layer, and the performing feature extraction on the sample face image by invoking the feature extraction submodel, to obtain a prediction feature image corresponding to the sample face image and a prediction feature vector corresponding to the prediction feature image includes:

performing feature extraction on the sample face image by invoking the feature extraction layer, to obtain the prediction feature image corresponding to the sample face image; and performing feature mapping on the prediction feature image by invoking the feature mapping layer, to obtain the prediction feature vector corresponding to the prediction feature image.

In one embodiment, the training the feature extraction submodel according to a difference between the prediction feature vector and the sample feature vector includes:

obtaining a first loss value between the prediction feature vector and the sample feature vector, the first loss value representing the difference between the prediction feature vector and the sample feature vector; and training the feature extraction submodel according to the first loss value.

In one embodiment, the face recognition model further includes a loss obtaining submodel, the loss obtaining submodel includes a weight vector corresponding to each face identifier, and the training the feature extraction submodel according to a difference between the prediction feature vector and the sample feature vector includes:

performing weighting processing, by invoking the loss obtaining submodel, on the prediction feature vector according to a weight vector corresponding to the face identifier to which the sample face image belongs, to obtain a weighted feature vector corresponding to the prediction feature vector;

obtaining a second loss value between the weighted feature vector and the sample feature vector, the second loss value representing a difference between the weighted feature vector and the sample feature vector; and training the feature extraction submodel and the loss obtaining submodel according to the second loss value.

In one embodiment, the training the prediction submodel according to the sample feature vector and center feature vectors corresponding to the sample face images in case of keeping the trained feature extraction submodel unchanged includes:

obtaining the center feature vector corresponding to the sample face image;

processing the prediction feature image by invoking the prediction submodel, to obtain a prediction feature value corresponding to the prediction feature image, the prediction feature value representing uncertainty corresponding to the prediction feature image, the uncertainty corresponding to the prediction feature image being a degree of difference between a face feature included in the prediction feature image and a face feature of the sample face image;

obtaining a third loss value according to the prediction feature vector, the center feature vector, and the prediction feature value, the third loss value representing a loss of the prediction feature value corresponding to the prediction feature image; and training the prediction submodel according to the third loss value.

In one embodiment, the obtaining a third loss value according to the prediction feature vector, the center feature vector, and the prediction feature value includes:

obtaining a target feature value according to a distance between the prediction feature vector and the center feature vector; and obtaining the third loss value according to a difference between the target feature value and the prediction feature value.

In one embodiment, the obtaining the center feature vector corresponding to the sample face image includes:

obtaining feature vectors corresponding to a plurality of face images, the plurality of face images being face images corresponding to the face identifiers to which the sample face images belong; and determining the center feature vector according to the plurality of obtained feature vectors.

In one embodiment, the obtaining the center feature vector corresponding to the sample face image includes:

obtaining the weight vector corresponding to the face identifier to which the sample face image belongs; and determining the weight vector corresponding to the sample face image as the center feature vector.

In one embodiment, before the obtaining a similarity between the target face image and a template face image according to the first feature vector, the first feature value, a second feature vector, and a second feature value, the method further includes:

performing feature extraction on the template face image, to obtain the second feature image corresponding to the template face image and the second feature vector corresponding to the second feature image; and processing the second feature image, to obtain the second feature value corresponding to the second feature image.

In one embodiment, the performing feature extraction on the template face image, to obtain the second feature image corresponding to the template face image and the second feature vector corresponding to the second feature image includes:

performing feature extraction on the template face image by invoking the feature extraction submodel in the face recognition model, to obtain the second feature image corresponding to the template face image and the second feature vector corresponding to the second feature image.

In one embodiment, the processing the second feature image, to obtain the second feature value corresponding to the second feature image includes:

processing the second feature image by invoking the prediction submodel in the face recognition model, to obtain the second feature value corresponding to the second feature image.

In one embodiment, the feature extraction submodel includes the feature extraction layer and the feature mapping layer, and the performing feature extraction on the template face image by invoking the feature extraction submodel in the face recognition model, to obtain the second feature image corresponding to the template face image and the second feature vector corresponding to the second feature image includes:

performing feature extraction on the template face image by invoking the feature extraction layer, to obtain the second feature image corresponding to the template face image; and performing feature mapping on the second feature image by invoking the feature mapping layer, to obtain the second feature vector corresponding to the second feature image.

An embodiment of the present disclosure further provides a computer program, storing at least one instruction, the at least one instruction being loaded and executed by a processor to implement the method steps of the foregoing face recognition method:

A person of ordinary skill in the art can understand that all or some of the steps of the embodiments may be implemented by hardware or a program instructing related hardware. The program is stored in a computer-readable storage medium. The storage medium includes a read-only memory, a magnetic disk, or an optical disc.

The foregoing descriptions are merely optional embodiments of the embodiments of the present disclosure, but are not intended to limit the embodiments of the present disclosure. Any modification, equivalent replacement, or improvement made within the spirit and principle of the embodiments of the present disclosure shall fall within the protection scope of the present disclosure.

What is claimed is:

1. A face recognition method, performed by a computer device, the method comprising:
performing feature extraction on a target face image in a hyperspherical space, to obtain a first feature image corresponding to the target face image and a first feature vector corresponding to the first feature image, wherein the first feature image is obtained by mapping face features of the target face image to the hyperspherical space;
processing the first feature image, to obtain a first feature value corresponding to the first feature image, the first feature value representing a degree of difference between a face feature comprised in the first feature image and a face feature of the target face image;
obtaining a similarity between the target face image and a template face image according to the first feature vector, the first feature value, a second feature vector, and a second feature value, the second feature vector being a feature vector corresponding to a second feature image of the template face image, the second feature image being obtained by mapping face features of the template face image to the hyperspherical space, the second feature value being a feature value corresponding to the second feature image, the second feature value representing a degree of difference between a face feature comprised in the second feature image and a face feature of the template face image; and
determining, when the similarity is greater than a preset threshold, that the target face image matches the template face image.

2. The method according to claim 1, wherein the performing feature extraction on a target face image, to obtain a first feature image corresponding to the target face image and a first feature vector corresponding to the first feature image comprises:
performing feature extraction on the target face image by using a feature extraction submodel in a face recognition model, to obtain the first feature image corresponding to the target face image and the first feature vector corresponding to the first feature image.

3. The method according to claim 2, wherein the feature extraction submodel comprises a feature extraction layer and a feature mapping layer, and the performing feature extraction on the target face image by invoking a feature extraction submodel in a face recognition model, to obtain the first feature image corresponding to the target face image and the first feature vector corresponding to the first feature image comprises:
performing feature extraction on the target face image by invoking the feature extraction layer, to obtain the first feature image corresponding to the target face image; and
performing feature mapping on the first feature image by invoking the feature mapping layer, to obtain the first feature vector corresponding to the first feature image.

4. The method according to claim 2, wherein the processing the first feature image, to obtain a first feature value corresponding to the first feature image comprises:
processing the first feature image by invoking a prediction submodel in the face recognition model, to obtain the first feature value corresponding to the first feature image.

5. The method according to claim 4, wherein before the processing the first feature image by invoking a prediction submodel in the face recognition model, to obtain the first feature value corresponding to the first feature image, the method further comprises:
training the feature extraction submodel according to sample face images and sample feature vectors corresponding to the sample face images; and
training the prediction submodel according to the sample feature vectors and center feature vectors corresponding to the sample face images in case of keeping the trained feature extraction submodel unchanged, each center feature vector representing a face feature corresponding to a face identifier to which the corresponding sample face image belongs.

6. The method according to claim 5, wherein the training the feature extraction submodel according to sample face images and sample feature vectors corresponding to the sample face images comprises: for one sample face image, obtaining the sample face image and the sample feature vector corresponding to the sample face image;
performing feature extraction on the sample face image by invoking the feature extraction submodel, to obtain a prediction feature image corresponding to the sample face image and a prediction feature vector corresponding to the prediction feature image; and
training the feature extraction submodel according to a difference between the prediction feature vector and the sample feature vector.

7. The method according to claim 6, wherein the feature extraction submodel comprises a feature extraction layer and a feature mapping layer, and the performing feature extraction on the sample face image by invoking the feature extraction submodel, to obtain a prediction feature image corresponding to the sample face image and a prediction feature vector corresponding to the prediction feature image comprises:
performing feature extraction on the sample face image by invoking the feature extraction layer, to obtain the prediction feature image corresponding to the sample face image; and
performing feature mapping on the prediction feature image by invoking the feature mapping layer, to obtain the prediction feature vector corresponding to the prediction feature image.

8. The method according to claim 6, wherein the training the feature extraction submodel according to a difference between the prediction feature vector and the sample feature vector comprises:
obtaining a first loss value between the prediction feature vector and the sample feature vector, the first loss value representing the difference between the prediction feature vector and the sample feature vector; and
training the feature extraction submodel according to the first loss value.

9. The method according to claim 6, wherein the face recognition model further comprises a loss obtaining submodel, the loss obtaining submodel comprises a weight vector corresponding to each face identifier, and the training the feature extraction submodel according to a difference between the prediction feature vector and the sample feature vector comprises:

performing weighting processing, by invoking the loss obtaining submodel, on the prediction feature vector according to a weight vector corresponding to the face identifier to which the sample face image belongs, to obtain a weighted feature vector corresponding to the prediction feature vector;

obtaining a second loss value between the weighted feature vector and the sample feature vector, the second loss value representing a difference between the weighted feature vector and the sample feature vector; and training the feature extraction submodel and the loss obtaining submodel according to the second loss value.

10. The method according to claim 9, wherein the training the prediction submodel according to the sample feature vector and center feature vectors corresponding to the sample face images in case of keeping the trained feature extraction submodel unchanged comprises:

obtaining the center feature vector corresponding to the sample face image;

processing the prediction feature image by invoking the prediction submodel, to obtain a prediction feature value corresponding to the prediction feature image, the prediction feature value representing uncertainty corresponding to the prediction feature image, the uncertainty corresponding to the prediction feature image being a degree of difference between a face feature comprised in the prediction feature image and a face feature of the sample face image;

obtaining a third loss value according to the prediction feature vector, the center feature vector, and the prediction feature value, the third loss value representing a loss of the prediction feature value corresponding to the prediction feature image; and training the prediction submodel according to the third loss value.

11. The method according to claim 10, wherein the obtaining a third loss value according to the prediction feature vector, the center feature vector, and the prediction feature value comprises:

obtaining a target feature value according to a distance between the prediction feature vector and the center feature vector; and obtaining the third loss value according to a difference between the target feature value and the prediction feature value.

12. The method according to claim 10, wherein the obtaining the center feature vector corresponding to the sample face image comprises:

obtaining feature vectors corresponding to a plurality of face images, the plurality of face images being face images corresponding to the face identifiers to which the sample face images belong; and determining the center feature vector according to the plurality of obtained feature vectors.

13. The method according to claim 10, wherein the obtaining the center feature vector corresponding to the sample face image comprises:

obtaining the weight vector corresponding to the face identifier to which the sample face image belongs; and determining the weight vector corresponding to the sample face image as the center feature vector.

14. The method according to claim 1, wherein before the obtaining a similarity between the target face image and a template face image according to the first feature vector, the first feature value, a second feature vector, and a second feature value, the method further comprises:

performing feature extraction on the template face image, to obtain the second feature image corresponding to the template face image and the second feature vector corresponding to the second feature image; and processing the second feature image, to obtain the second feature value corresponding to the second feature image.

15. The method according to claim 14, wherein the performing feature extraction on the template face image, to obtain the second feature image corresponding to the template face image and the second feature vector corresponding to the second feature image comprises:

performing feature extraction on the template face image by invoking a feature extraction submodel in a face recognition model, to obtain the second feature image corresponding to the template face image and the second feature vector corresponding to the second feature image.

16. The method according to claim 15, wherein the processing the second feature image, to obtain the second feature value corresponding to the second feature image comprises:

processing the second feature image by invoking a prediction submodel in the face recognition model, to obtain the second feature value corresponding to the second feature image.

17. The method according to claim 15, wherein the feature extraction submodel comprises a feature extraction layer and a feature mapping layer, and the performing feature extraction on the template face image by invoking a feature extraction submodel in a face recognition model, to obtain the second feature image corresponding to the template face image and the second feature vector corresponding to the second feature image comprises:

performing feature extraction on the template face image by invoking the feature extraction layer, to obtain the second feature image corresponding to the template face image; and performing feature mapping on the second feature image by invoking the feature mapping layer, to obtain the second feature vector corresponding to the second feature image.

18. The method according to claim 1, further comprising:

training a prediction submodel of a face recognition model according to sample feature vectors and center feature vectors corresponding to the sample face images while keeping a trained feature extraction submodel of the face recognition model unchanged, each center feature vector representing a face feature corresponding to a face identifier to which the corresponding sample face image belongs;

wherein:

the feature extraction of the target face image is performed by using the trained feature extraction submodel; and the first feature image is processed by invoking the prediction submodel, to obtain the first feature value corresponding to the first feature image.

19. A face recognition apparatus, comprising at least one memory and at least one processor coupled to the at least one memory, the at least one processor being configured to:

perform feature extraction on a target face image in a hyperspherical space, to obtain a first feature image corresponding to the target face image and a first feature vector corresponding to the first feature image, wherein the first feature image is obtained by mapping face features of the target face image to the hyperspherical space;

process the first feature image, to obtain a first feature value corresponding to the first feature image, the first feature value representing a degree of difference between a face feature comprised in the first feature image and a face feature of the target face image;

obtain a similarity between the target face image and a template face image according to the first feature vector, the first feature value, a second feature vector, and a second feature value, the second feature vector being a feature vector corresponding to a second feature image of the template face image, the second feature image being obtained by mapping face features of the template face image to the hyperspherical space, the second feature value being a feature value corresponding to the second feature image, the second feature value representing a degree of difference between a face feature comprised in the second feature image and a face feature of the template face image; and determine, when the similarity is greater than a preset threshold, that the target face image matches the template face image.

20. A non-transitory computer-readable storage medium, storing at least one instruction, the at least one instruction being loaded and executed by at least one processor to implement:

performing feature extraction on a target face image in a hyperspherical space, to obtain a first feature image corresponding to the target face image and a first feature vector corresponding to the first feature image, wherein the first feature image is obtained by mapping face features of the target face image to the hyperspherical space;

processing the first feature image, to obtain a first feature value corresponding to the first feature image, the first feature value representing a degree of difference between a face feature comprised in the first feature image and a face feature of the target face image;

obtaining a similarity between the target face image and a template face image according to the first feature vector, the first feature value, a second feature vector, and a second feature value, the second feature vector being a feature vector corresponding to a second feature image of the template face image, the second feature image being obtained by mapping face features of the template face image to the hyperspherical space, the second feature value being a feature value corresponding to the second feature image, the second feature value representing a degree of difference between a face feature comprised in the second feature image and a face feature of the template face image; and determining, when the similarity is greater than a preset threshold, that the target face image matches the template face image.

\* \* \* \* \*